(12) United States Patent
Tomura

(10) Patent No.: US 7,967,999 B2
(45) Date of Patent: Jun. 28, 2011

(54) HEAT STORAGE SUBSTANCE, HEAT STORAGE AGENT, HEAT RESERVOIR, HEAT TRANSPORT MEDIUM, COLD INSULATION AGENT, COLD INSULATOR, MELTING POINT CONTROL AGENT FOR HEAT STORAGE AGENT AND SUPERCOOLING PREVENTIVE AGENT FOR HEAT STORAGE AGENT

(75) Inventor: Keiji Tomura, Kawasaki (JP)

(73) Assignee: JFE Engineering Corporation, Tokyo (JP)

( * ) Notice: Subject to any disclaimer, the term of this patent is extended or adjusted under 35 U.S.C. 154(b) by 775 days.

(21) Appl. No.: 11/919,677

(22) PCT Filed: Jun. 8, 2006

(86) PCT No.: PCT/JP2006/311538
§ 371 (c)(1),
(2), (4) Date: Oct. 31, 2007

(87) PCT Pub. No.: WO2006/132322
PCT Pub. Date: Dec. 14, 2006

(65) Prior Publication Data
US 2010/0133464 A1 Jun. 3, 2010

(30) Foreign Application Priority Data

Jun. 8, 2005 (JP) .................................. 2005-168888
Dec. 14, 2005 (JP) .................................. 2005-360512
Dec. 14, 2005 (JP) .................................. 2005-360513

(51) Int. Cl.
*C09K 5/06* (2006.01)
(52) U.S. Cl. .............. 252/70; 252/71; 252/77; 252/78.1; 62/4; 165/10; 165/104.19
(58) Field of Classification Search .................... 252/70, 252/71, 77, 78.1; 62/4; 165/10, 104.19
See application file for complete search history.

(56) References Cited

U.S. PATENT DOCUMENTS

| | | | |
|---|---|---|---|
| 3,976,584 A | | 8/1976 | Leifer et al. |
| 6,063,972 A | * | 5/2000 | Duncum et al. .............. 585/15 |
| 6,237,346 B1 | | 5/2001 | Ogoshi et al. |
| 6,251,836 B1 | * | 6/2001 | Duncum et al. ............... 507/90 |
| 6,436,877 B1 | * | 8/2002 | Duncum et al. ............... 507/90 |
| 6,560,971 B2 | | 5/2003 | Takao et al. |
| 6,596,911 B2 | * | 7/2003 | Przybylinski et al. .......... 585/15 |

FOREIGN PATENT DOCUMENTS

| | | | |
|---|---|---|---|
| DE | 3115961 A | * | 11/1982 |
| JP | 60-243186 | | 12/1985 |
| JP | 9-291272 | | 11/1997 |
| JP | 11-264681 | | 9/1999 |
| JP | 2000-96041 | | 4/2000 |
| JP | 2000-256659 | | 9/2000 |
| JP | 3309760 | | 5/2002 |
| JP | 2004-93052 | | 3/2004 |
| JP | 2004-263090 | | 9/2004 |
| JP | 3641362 | | 1/2005 |
| JP | 2005-36060 | | 2/2005 |
| JP | 2007161894 A | * | 6/2007 |
| JP | 2007246666 | * | 9/2007 |
| JP | 2008101115 A | * | 5/2008 |
| WO | WO2009/0413961 | * | 2/2009 |

OTHER PUBLICATIONS

International Search Report dated Sep. 19, 2006.
Nakayama, "Hydrates of Organic Compounds. VII. The Effect of Anoins on the Formation of Clathrate . . .", The Chemical Society of Japan, Bull. Chem. Soc. Jpn., 56, 877-880 (1983).
Nakayama, "Hydrates of Organic Compounds. VII. The Effect of Anions . . .", Bull. Chem. Soc. Jpn., 56, 877-880 (1983).
Official Action and English translation issued Apr. 22, 2010 in Taiwanese application 95120440.

* cited by examiner

*Primary Examiner* — Anthony J Green
(74) *Attorney, Agent, or Firm* — Nixon & Vanderhye P.C.

(57) ABSTRACT

It is possible to provide a heat storage substance, a heat storage agent, a heat transport medium, and a cold insulation agent having low corrosiveness and a high latent heat quantity at a low cost, their production method, and a cold reservoir and a cold insulator containing the heat storage substance as content. The heat storage substance is characterized by containing a tri-n-butylalkylammonium salt and water. The heat storage substance is characterized by containing either tri-n-butyl-n-pentylammonium bromide or tri-n-butyl-n-pentylammonium chloride and water. The heat storage agent is characterized by containing a tri-n-butylalkylammonium salt and water. The heat storage agent is characterized by containing either tri-n-butyl-n-pentylammonium bromide or tri-n-butyl-n-pentylammonium chloride and water. The heat transport medium is characterized by containing a tri-n-butylalkylammonium salt and water. The heat transport medium is characterized by containing either tri-n-butyl-n-pentylammonium bromide or tri-n-butyl-n-pentylammonium chloride and water.

9 Claims, 6 Drawing Sheets

US 7,967,999 B2

HEAT STORAGE SUBSTANCE, HEAT STORAGE AGENT, HEAT RESERVOIR, HEAT TRANSPORT MEDIUM, COLD INSULATION AGENT, COLD INSULATOR, MELTING POINT CONTROL AGENT FOR HEAT STORAGE AGENT AND SUPERCOOLING PREVENTIVE AGENT FOR HEAT STORAGE AGENT

This application is the U.S. national phase of International Application No. PCT/JP2006/311538 filed 8 Jun. 2006 which designated the U.S. and claims priority to JP 2005-168888 filed 8 Jun. 2005, JP 2005-360512 filed 14 Dec. 2005, and JP 2005-360513 filed 14 Dec. 2005, the entire contents of each of which are hereby incorporated herein by reference.

TECHNICAL FIELD

The present invention relates to a heat storage substance having a heat-storing function, and further to, for example, a heat storage agent, a heat reservoir, a heat transport medium, a melting point control agent for heat storage agents, and a supercooling preventive agent for heat storage agents to be used for air conditioning facilities for heating and cooling and refrigerating apparatus for food. Further, the present invention relates to a cold insulation agent and a cold insulator, obtained by packing the cold insulation agent in a container, to be used for preservation, transportation, cooling, or the like at a low temperature in food stuff, processed food products, and medical care fields. Further, the present invention relates to a method for producing a substance to be a main component (hereinafter, referred to as a main agent) of the heat storage agent, heat transport medium, or cold insulation agent.

In the present invention, a substance having a heat-storing function is referred to as "a heat storage substance".

Further, in the present invention, a substance containing the heat storage substance and employed for heat storage is referred to as "a heat storage agent", and a body obtained by packing or storing the heat storage agent in a container and employed for heat storage is referred to as "a heat reservoir".

In the present invention, a substance containing the heat reservoir and employed directly or indirectly for heat transport is widely referred to as "a heat transport medium". Accordingly, "the heat transport medium" includes not only a substance to be used for heat transport between a water heater or cooler and an air conditioner (a substance which can store heat or cold in a water heater or cooler and release heat or cold after being transported to an air conditioner provided at a place of using heat) but also a substance which is stored after storing heat or while storing heat and from which heat is taken out and used for a desired purpose. For example, in the case a place where heat is stored in a heat storage substance and a place where heat stored in the heat storage substance is used are different and accordingly heat transport occurs between these places, the heat storage substance is included in the heat transport medium which finally contributes to heat transportation.

In the present invention, a substance containing a heat storage substance and having a cold-insulating (or cooling) function is referred to as "a cold insulation agent", and a body obtained by packing the cold insulation agent in a container or bag and employed for cold insulation is referred to as "a cold insulator". They are respectively called a cold insulation agent and a cold insulator depending on the temperature range of heat to be stored and the temperature range for use and, needless to say, they are respectively a form of the heat storage agent and heat reservoir.

Further, in the present invention, a main agent of the heat storage agent is referred to as "a heat storage main agent". However, except the case of explaining a substance to be a main component of a heat storage agent or a component other than the main component or the case of particularly distinguishing it from a heat storage agent, the heat storage main agent is also referred to as a heat storage agent. Similarly, except the case of explaining a substance to be a main component of a heat transport medium or a component other than the main component or the case of particularly distinguishing it from a heat transport medium, the main agent of a heat transport medium is also referred to as a heat transport medium.

Further, in the present invention, a substance to be a main component is referred to as "a main agent", and "a main agent" is not limited to a substance whose content is the maximum but may include a plurality of components serving as main constituents, exhibiting functions of heat storage, heat transport, and cold insulation.

BACKGROUND ART

Heat Storage Substance, Heat Storage Agent, and Heat Transport Medium

As compared with a sensible heat storage agent, a latent heat storage agent has advantages: a high heat storage density, a constant phase change temperature, a stable heat output temperature, or the like and therefore has been employed for various practical uses.

In an air conditioning system, in order to save installation cost or operating cost, it has been required to decrease the pump power for transporting a heat medium. Furthermore, in order to increase the heat transport density, it has been discussed to use a latent heat storage-transport medium with a high heat storage density.

As heat storage substances, main constituent substances of such a latent heat storage agent or a latent heat storage-transport medium, have been known paraffins such as n-hexadecane and n-pentadecane; and hydrates of trimethylolethane and tetraalkylammonium compounds. However, paraffins are disadvantageous because they are combustible and therefore have to be handled carefully, have high viscosity, and are also inferior in heat conductivity at the time of heat exchange. Trimethylolethane is disadvantageous in a significant supercooling phenomenon at the time of production of its hydrate.

On the other hand, hydrates of tetraalkylammonium compounds have high latent heat at the time of production of the hydrates and therefore have a relatively high heat storage quantity. Unlike paraffins, the hydrates are not combustible and therefore easy to be handled and very useful heat storage substances.

Clathrate hydrates of tetraalkylammonium compounds have a congruent melting point higher than 0° C., a melting point of ice, and therefore have advantages that temperature of a refrigerant at the time of production of the hydrates by cooling a heat storage agent may be high and that the coefficient of performance (COP) of a refrigerator can be increased to save energy.

The congruent melting point means the temperature in the case the composition is not changed before and after phase change from an aqueous solution (liquid phase) to a hydrate (solid phase) at the time of production of the hydrate by cooling an aqueous solution of a compound to be hydrated (for example, a hydrate is produced with the same concentration as the concentration of a compound in an aqueous solution to form the hydrate). In a phase diagram in which the melting point is plotted in the ordinate axis and concentration is plotted in the abscissa axis, the maximum point becomes the congruent melting point. In the present invention, the concentration at which the congruent melting point is obtained is called a congruent concentration.

When an aqueous solution with a congruent concentration is cooled, production of a hydrate starts at the congruent melting point and the temperature is kept constant at the congruent melting point until all of the aqueous solution becomes the hydrate. Also at the time of melting, the melting occurs at this constant congruent melting point. At the time of the freezing and melting, the latent heat quantity of the hydrate becomes the maximum with the congruent concentration.

When the concentration becomes lower or higher than the congruent concentration, the melting point becomes lower than the congruent melting point.

It is disclosed to use, as a tetraalkylammonium compound, for example, tetra-n-butylammonium bromide having a congruent melting point of about 12° C. for a heat storage agent or a heat transport medium for air conditioning (see Patent Document 1).

It is also disclosed to use, as another example of tetraalkylammonium compounds, tetra-n-butylammonium nitrate having a congruent melting point of about 6.5° C. for a heat storage agent for air conditioning, too (see Patent Document 2).

A method for producing tetra-n-butylammonium nitrate is disclosed in Non-patent Document 1 in the following manner.

At first, tetra-n-butylammonium iodide to be a starting material is synthesized by the following reaction, under presence of a proper solvent:

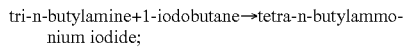

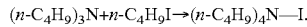

Successively, using water as a solvent, the following reaction is carried out to synthesize tetra-n-butylammonium nitrate:

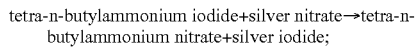

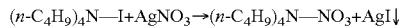

The precipitated silver iodide is removed by filtering.

In the above-mentioned manner, synthesis of tetra-n-butylammonium nitrate requires at least three steps of synthesizing tetra-n-butylammonium iodide as the starting material; synthesizing tetra-n-butylammonium nitrate; and removing silver iodide.

On the other hand, Patent Document 3 discloses production of a heat storage agent with an arbitrary melting point by mixing a substance with a lower freezing point than that of water, e.g., ethylene glycol or propylene glycol, with an aqueous solution of tetra-n-butylammonium bromide and accordingly lowering a melting point of a hydrate.

The state that an aqueous solution for a hydrate production is cooled to a hydrate production temperature (melting point) and no hydrate is produced yet and the aqueous solution is kept in the phase as it is even the solution is further cooled is called supercooling state. In the case of using a hydrate for a heat storage agent, if the supercooling is significant, it becomes a problem that the refrigerant temperature has to be low for cooling the aqueous solution. Accordingly, it is important to make the supercooling as slight as possible and thus suppress the supercooling. To prevent the supercooling, fine particles are added, as a nucleating material of hydrate, to the heat storage agent to release supercooling.

(Cold Insulation Agent)

In the case of preserving and transporting fresh fish and shellfish, fresh vegetable, fruits, meats, other perishable food, processed food products, dairy products, flowers, films, pharmaceutical products, medical samples, or the like at a low temperature and temporarily storing them at a low temperature in a place where no cold insulating facility is available, a cold insulator is employed for keeping their freshness, tastes, qualities, functions, and effect.

The cold insulator is also used for, for example, local cooling of a human body.

Various kinds of compositions using latent heat by which phase change is accompanied have been employed as the cold insulation agent. A latent cold insulation agent which is previously cooled and frozen is melted at a constant melting temperature since it contains latent heat, so that the agent can keep an object to be cooled at a low temperature.

The cold insulation agent is required to have the following properties:

(A) To have a phase change temperature (melting point) corresponding to a desirable and proper temperature or temperature range (hereinafter, referred to as "a proper cooling temperature") for an object to be cooled (hereinafter referred to as "an object to be cooled"):

That is, it is desirable that a melting temperature (equivalent to the melting point) or a melting temperature range, which is kept until the frozen cold insulation agent is melted to completely release the stored latent heat, corresponds to the proper cooling temperature of the object to be cooled.

(B) To have a large latent heat quantity:

If the latent heat quantity is high, the time taken for the frozen cold insulation agent to completely release the stored latent heat by melting is prolonged and the time to keep temperature at the melting temperature becomes long and accordingly, the time to keep the proper cooling temperature becomes preferably long.

(C) To have a high specific heat in liquid phase of the cold insulation agent:

Upon completion of release of latent heat by melting the frozen cold insulation agent, the temperature of the cold insulation agent in the liquid phase is increased and if the specific heat of the cold insulation agent in the liquid phase is high, it takes a long time for the cold insulation agent to reach the ambient temperature and the object to be cooled can be kept at a temperature nearer to the proper cooling temperature for a longer duration and accordingly deterioration of the freshness, quality, function, effect or the like of the object to be cooled can be further delayed; and (D) Not to cause phase separation or not to be deteriorated by repeated freezing and melting:

The cold insulation agent is required to stand for use of repeated freezing and melting. Therefore, it is required to cause no phase separation phenomenon that the cold insulation agent is not partially melted and remains in solid-phase at the time of melting or cause no deterioration in the heat storing function by repeated freezing and melting by which latent heat storage and release are repeated.

As described above, important properties of a latent cold insulation agent to be used as a cold insulation agent can be summarized as (A) a melting point corresponding to a proper cooling temperature; (B) a large latent heat quantity; (C) a high specific heat in liquid phase; and (D) durability to repeated use.

If (E) a latent cold insulation agent which is previously cooled and frozen keeps a melting temperature constant and is melted at a constant temperature or with an utmost slight change of the melting temperature along with melting when it is melted, the object to be cooled can be kept at a constant low temperature and therefore, it is more preferable.

Further, (F) the agent is required to have non-flammability.

A heat storage agent using latent heat in an air conditioning field may include heat storage agents containing ice, paraffins, inorganic hydrates, organic hydrates, or the like as a main agent and it is supposed to be possible to employ them as a latent cold insulation agent.

As a latent heat storage agent containing an organic hydrate as a main agent has been known trimethylolethane (TME) hydrate and TME-water-urea based tertiary systems have been mainly discussed (see Patent Document 4).

Further, there are quaternary ammonium compound hydrates as other examples of the latent heat storage agent containing an organic hydrate as a main agent (see Patent Document 5).

Patent Document 1: Japanese Patent No. 3309760
Patent Document 2: Jpn. Pat. Appln. KOKAI Publication No. 9-291272
Patent Document 3: Jpn. Pat. Appln. KOKAI Publication No. 11-264681
Patent Document 4: Jpn. Pat. Appln. KOKAI Publication No. 2000-256659
Patent Document 5: Japanese Patent No. 3641362
Non-patent Document 1: Bull. Chem. Soc. Jpn, 56, 877 (1983)

DISCLOSURE OF INVENTION

Problems of Heat Storage Substance, Heat Storage Agent, and Heat Transport Medium It is preferable that a congruent melting point of a clathrate hydrate, which is a heat storage substance, is lower than an aimed temperature to be cooled by a heat storage agent or a heat transport medium since the latent heat can be efficiently utilized. On the other hand, if the congruent melting point of the clathrate hydrate is much lower than the aimed temperature, the refrigerant temperature has to be lowered correspondingly and the coefficient of performance (COP) of a refrigerator is lowered, resulting in an undesirable consequence that the energy consumption cannot be saved.

Thus, the heat storage temperature of the heat storage agent or the heat transport medium is required to be proper in accordance with an object to be cooled or the heat storage purpose of the heat storage agent or the heat transport medium and accordingly, a heat storage agent or a heat transport medium having a congruent melting point suitable for that is needed and also a heat storage substance to be a main agent for them is needed.

For example, in the case of using a heat storage agent for cold storing of an air conditioner, cold output temperature from the heat storage agent is required to be 5 to 12° C. The congruent melting point of the heat storage agent is preferably slightly lower than the cold output temperature. As such a heat storage agent, the above-mentioned tetrabutylammonium nitrate hydrate (congruent melting point of 6.5° C.) has been known.

However, as described above, tetra-n-butylammonium nitrate requires at least three steps of: synthesizing tetra-n-butylammonium iodide as a starting material; synthesizing tetra-n-butylammonium nitrate; and removing silver iodide. Therefore, it industrially costs very much and not practically usable due to high installation cost and operating cost of an air conditioning system.

Further, there is also a problem of producing byproducts such as silver iodide.

As described above, the heat storage temperature of the heat storage agent or the heat transport medium is required to be proper in accordance with an object to be cooled or the heat storage purpose of the heat storage agent or the heat transport medium, and a heat storage agent and a heat transport medium having a congruent melting point suitable for that is required, and also required is a heat storage substance to be a main agent for them. So far, such a heat storage substance, heat storage agent, or heat transport medium has not been known well and even if there are some which have been known, they cost much to be produced just like the above-mentioned tetra-n-butylammonium nitrate and are therefore not practically usable. Further, tetra-n-butylammonium nitrate is highly corrosive and has another problem for practical use.

Further, in terms of the practical use, there is a problem of the above-mentioned trimethylolethane that the supercooling phenomenon is significant at the time of producing its hydrate.

In the case of mixing a substance with a melting point lower than that of water for controlling the melting point of a heat storage agent just like the case described in Patent Document 3, there is also a problem that the latent heat quantity of the heat storage agent as a whole is decreased to lower the heat storing function.

Further, even if fine particles are mixed for preventing supercooling at the time of producing a hydrate, there occurs a problem that no supercooling preventive effect is caused unless the fine particles are dispersed evenly or a problem that the supercooling preventive effect is diminished after the fine particles are separated due to repeated freezing and melting.

As described above, no heat storage agent or heat transport medium which is economical and has scarce supercooling degree and low corrosiveness has been made available so far. Therefore, it has been desired to develop a heat storage agent and a heat transport medium which satisfy the above-mentioned conditions and have a high latent heat quantity, and a heat storage substance to be a main agent for them.

Further, it has been desired to develop a melting point control agent capable of controlling a melting point of a heat storage agent without decreasing the latent heat quantity of the agent and a supercooling preventive agent having high supercooling preventive effect and capable of keeping the supercooling preventive effect even after repeated freezing and melting.

The present invention has been accomplished to solve the above-mentioned problems.

(Problems of Cold Insulation Agent)

Many an object to be cooled including fresh fish, perishable food, and diary products has a proper cooling temperature in the range of 0 to 10° C. A latent heat storage agent having a melting point in the temperature range may include, for example, those containing ice, paraffins, inorganic hydrates, or organic hydrates as a main agent.

Although ice is generally used for cooling and keeping cold at the time of distribution of fresh fish, cold insulation is at 0° C. and it is impossible to keep cold insulation at the range of 5 to 10° C. suitable for keeping so-called "live" state from immediately after death to the complete stiffness, during which the commercial value as high as that of fresh fish is attained. Therefore, there is a problem that ice cannot be employed as the cold insulation agent for distribution of "live" fresh fish with high commercial value at a temperature higher than 0° C.

Paraffins are combustible and thus there is a problem to use them for a cold insulation agent. Inorganic hydrates cannot satisfy the condition (D) that they cause neither phase separation by repeated freezing and melting nor deterioration of performance, and are therefore unsuitable as a cold insulation agent. For example, a heat storage agent obtained by adding ammonium chloride as a melting point control agent to sodium sulfate decahydrate is known as an inorganic salt hydrate type heat storage agent having a melting point of 9° C., but it tends to easily cause phase separation when being repeatedly frozen and melted.

With respect to a heat storage agent composition containing a clathrate hydrate descried in Patent Document 4 as a main agent, it is the that no phase separation is caused even if freezing and melting is repeated a hundred times. However, the melting point thereof is higher than 10° C. and therefore it is not suitable for cold insulation of an object to be cooled having a proper cooling temperature in the range of 0 to 10° C., particularly "live" fresh fish desired to be cooled in the range of 5 to 10° C.

Further, exemplifying tetra-n-butylammonium bromide (TBAB) among latent heat storage agents containing a quaternary ammonium clathrate hydrate described in Patent Document 5 as a main agent, the melting point (the congruent melting point) of an aqueous solution of TBAB in a concentration of 40% by weight, at which the congruent melting point is obtained, is about 12° C. and at this temperature, heat storage and release is repeatedly carried out while never or scarcely causing phase separation. However, although satisfying the condition of a cold insulation agent that it stands for repeated use, it cannot be used as the cold insulation agent for an object to be cooled which has a proper cooling temperature in the range of 5 to 10° C.

As described, the respective latent cold insulation agents which have been employed practically or proposed have problems so far.

The present invention has been accomplished to solve the above-mentioned problems and aims to provide a cold insulation agent satisfying the above-mentioned conditions (A) to (F) and usable for cold insulation of an object to be cooled having a proper cooling temperature in a range higher than 0° C. and lower than 10° C., and also a cold insulator configured by packing the cold insulation agent in a container or a bag body.

(1) A heat storage substance according to the present invention is characterized by comprising a tri-n-butylalkylammonium salt and water.

An aqueous solution containing the tri-n-butylalkylammonium salt and water is cooled to produce a tri-n-butylalkylammonium salt hydrate which can be used as a main component for a heat storage substance.

Examples of the alkyl may include those other than n-butyl, such as n-pentyl, iso-pentyl, n-propyl, iso-propyl, ethyl, methyl, n-hexyl, iso-hexyl, n-heptyl, iso-heptyl, and iso-butyl.

Examples of the ammonium salt may include ammonium bromide, ammonium fluoride, ammonium nitrate, ammonium nitrite, ammonium chlorate, ammonium perchlorate, ammonium bromate, ammonium iodate, ammonium carbonate, ammonium phosphate, ammonium tungstate, ammonium sulfate, ammonium hydroxide, ammonium carboxylate, ammonium dicarboxylate, ammonium sulfonate, and ammonium disulfonate.

(2) A heat storage substance according to the present invention is characterized by comprising either tri-n-butyl-n-pentylammonium bromide or tri-n-butyl-n-pentylammonium chloride and water.

(3) A heat storage substance according to the present invention is characterized by comprising tri-n-butyl-n-pentylammonium bromide hydrate or tri-n-butyl-n-pentylammonium chloride hydrate as a main component.

It has been confirmed that tri-n-butyl-n-pentylammonium bromide forms a clathrate hydrate and its congruent melting point is about 6° C., whose latent heat quantity at the congruent melting point is 193 J/g, which is much higher than the latent heat quantity of tetra-n-butylammonium nitrate, 176 J/g.

Further, it has been found that tri-n-butyl-n-pentylammonium bromide can be produced at a low cost by a simpler process (the production method will be described later) than that for tetra-n-butylammonium nitrate.

Further, according to the finding of an investigation on corrosiveness of tetra-n-butylammonium nitrate, it has been made clear that the corrosiveness of tri-n-butyl-n-pentylammonium bromide is much lower than that of tetra-n-butylammonium nitrate and from a viewpoint of this, tri-n-butyl-n-pentylammonium bromide has been found to have remarkably high practical usability.

The present inventors have synthesized tri-n-butyl-n-pentylammonium chloride by the method described later and have found that a mixture of this compound and water forms a hydrate. The congruent melting point of tri-n-butyl-n-pentylammonium chloride is about 9° C., and the latent heat quantity at the congruent melting point is 195 J/g, which is much higher than the latent heat quantity of tetra-n-butylammonium bromide hydrate or tetra-n-butylammonium nitrate hydrate, 176 J/g.

Further, it has been found that tri-n-butyl-n-pentylammonium chloride can be produced at a low cost by a simple process (the production method will be described later).

As described, it can be the that the heat storage substances according to the present invention have a congruent melting point in the range of 5 to 12° C. and an excellent heat storing function, and may be main components of an inexpensive heat storage agent or heat transport medium.

(4) A heat storage agent according to the present invention is characterized by comprising a tri-n-butylalkylammonium salt and water.

An aqueous solution containing the tri-n-butylalkylammonium salt and water is cooled to produce a tri-n-butylalkylammonium salt hydrate and obtain a heat storage agent containing the hydrate as a main component.

Examples of the alkyl may include those other than n-butyl, such as n-pentyl, iso-pentyl, n-propyl, iso-propyl, ethyl, methyl, n-hexyl, iso-hexyl, n-heptyl, iso-heptyl, and iso-butyl.

Examples of the ammonium salt may include ammonium bromide, ammonium fluoride, ammonium nitrate, ammonium nitrite, ammonium chlorate, ammonium perchlorate, ammonium bromate, ammonium iodate, ammonium carbonate, ammonium phosphate, ammonium tungstate, ammonium sulfate, ammonium hydroxide, ammonium carboxylate, ammonium dicarboxylate, ammonium sulfonate, and ammonium disulfonate.

(5) A heat storage agent according to the present invention is characterized by comprising either tri-n-butyl-n-pentylammonium bromide or tri-n-butyl-n-pentylammonium chloride and water.

(6) A heat storage agent according to the present invention is characterized by comprising tri-n-butyl-n-pentylammonium bromide hydrate or tri-n-butyl-n-pentylammonium chloride hydrate as a main component.

It has been confirmed that tri-n-butyl-n-pentylammonium bromide forms a clathrate hydrate and its congruent melting point is about 6° C., whose latent heat quantity at the congruent melting point is 193 J/g, which is much higher than the latent heat quantity of tetra-n-butylammonium nitrate, 176 J/g.

Further, it has been found that tri-n-butyl-n-pentylammonium bromide can be produced at a low cost by a simpler process (the production method will be described later) than that for tetra-n-butylammonium nitrate.

Further, according to the finding of an investigation on corrosiveness of tetra-n-butylammonium nitrate, it has been made clear that the corrosiveness of tri-n-butyl-n-pentylammonium bromide is much lower than that of tetra-n-butylammonium nitrate and from a viewpoint of this, tri-n-butyl-n-pentylammonium bromide has been found to have remarkably high practical usability.

The present inventors have synthesized tri-n-butyl-n-pentylammonium chloride by the method described later and have found that a mixture of this compound and water forms a hydrate. The congruent melting point of tri-n-butyl-n-pentylammonium chloride is about 9° C. and the latent heat quantity at the congruent melting point is 195 J/g, which is much higher than the latent heat quantity of tetra-n-butylammonium bromide hydrate or tetra-n-butylammonium nitrate hydrate, 176 J/g.

Further, it has been found that tri-n-butyl-n-pentylammonium chloride can be produced at a low cost by a simple process (the production method will be described later).

As described, it can be the that the heat storage agents according to the present invention have a congruent melting point in the range of 5 to 12° C. and an excellent heat storing function, and can be low cost heat storage agents.

(7) A heat storage agent according to the present invention is characterized by comprising either tri-n-butyl-n-pentylammonium bromide or tri-n-butyl-n-pentylammonium chloride, a tetraalkylammonium compound, and water.

(8) A heat storage agent according to the present invention is characterized by comprising either tri-n-butyl-n-pentylammonium bromide hydrate or tri-n-butyl-n-pentylammonium chloride hydrate and a tetraalkylammonium compound hydrate.

(9) A heat storage agent according to the present invention is characterized by comprising either tri-n-butyl-n-pentylammonium bromide hydrate or tri-n-butyl-n-pentylammonium chloride hydrate and tetra-n-butylammonium bromide hydrate.

Examples of the tetraalkylammonium compound may include tetraalkylammonium-anion salts.

Examples of the anion may include Br, F, Cl, $C_2H_5COO$, OH, $CH_3COO$, HCOO, $CH_3SO_3$, $CO_3$, $PO_4$, $HPO_4$, $WO_4$, i-$C_3H_7COO$, $O_3S(CH_2)_2SO_3$, s-$C_4H_9COO$, $NO_3$, $(CH_3)_2CH(NH_2)_2COO$, n-$C_3H_7SO_3$, $CF_3COO$, $CrO_3$, and $SO_4$.

Examples of the alkyl may include n-butyl, iso-butyl, n-pentyl, iso-pentyl, n-propyl, iso-propyl, ethyl, methyl, n-hexyl, iso-hexyl, n-heptyl, iso-heptyl, and iso-butyl.

A specific example of the tetraalkylammonium-anion salts may be tetra-n-butylammonium bromide.

When a tetraalkylammonium compound which forms a hydrate having a different melting point from that of tri-n-butyl-n-pentylammonium bromide hydrate or tri-n-butyl-n-pentylammonium chloride hydrate and either one of tri-n-butyl-n-pentylammonium bromide and tri-n-butyl-n-pentylammonium chloride are mixed with water, it is possible to make the temperature (melting point of a mixture) at which the hydrate is produced by cooling the resultant aqueous solution mixture lower or higher than the melting point of tri-n-butyl-n-pentylammonium bromide hydrate or tri-n-butyl-n-pentylammonium chloride hydrate alone. Accordingly, it is possible that the melting point of a mixture containing the tetraalkylammonium compound with tri-n-butyl-n-pentylammonium bromide or tri-n-butyl-n-pentylammonium chloride can be adjusted in a desired range by adjusting the mixing composition of the mixture. Therefore, it is possible to provide a heat storage agent having a melting point suitable for heat storage temperature required in accordance with an object to be cooled by the heat storage agent or the purpose of heat storage.

It has been confirmed that the total latent heat quantity of the mixture is approximately the total heat quantity calculated by multiplying the respective latent heat quantities of the tetraalkylammonium compound and either tri-n-butyl-n-pentylammonium bromide hydrate or tri-n-butyl-n-pentylammonium chloride hydrate by their composition ratios.

(10) The heat storage agent of the present invention is characterized in that the tri-n-butyl-n-pentylammonium bromide according to any one of (5) to (9) is synthesized from tributylamine and 1-bromopentane. A specific production method will be described later.

(11) The heat storage agent of the present invention is characterized in that the tri-n-butyl-n-pentylammonium chloride according to any one of (5) to (9) is synthesized by exchanging bromine of tri-n-butyl-n-pentylammonium bromide synthesized from tributylamine and 1-bromopentane for chlorine by anion exchange resin. A specific production method will be described later.

(12) A heat transport medium according to the present invention is characterized by comprising a tri-n-butylalkylammonium salt and water.

(13) A heat transport medium according to the present invention is characterized by comprising either tri-n-butyl-n-pentylammonium bromide or tri-n-butyl-n-pentylammonium chloride and water.

(14) A heat transport medium according to the present invention is characterized by comprising tri-n-butyl-n-pentylammonium bromide hydrate or tri-n-butyl-n-pentylammonium chloride hydrate as a main component.

(15) A heat transport medium according to the present invention is characterized by consisting of an aqueous solution containing tri-n-butyl-n-pentylammonium bromide or an aqueous solution containing tri-n-butyl-n-pentylammonium chloride, and in that the medium produces hydrate upon cooling thereby forming slurry.

When an aqueous solution containing tri-n-butyl-n-pentylammonium bromide or tri-n-butyl-n-pentylammonium chloride is cooled, a hydrate is produced and consequently slurry containing hydrate particles dispersed in the aqueous solution or water is obtained. This slurry has a high latent heat storage quantity and also high fluidity and is therefore excellent as a heat transport medium.

An aqueous solution of 15% tri-n-butyl-n-pentylammonium bromide is prepared and cooled to 4° C. to produce a hydrate and consequently produce hydrate slurry containing the hydrate particles dispersed in the aqueous solution. As a result, it has been confirmed that the slurry has approximately the same dynamic viscosity as that of water and is usable for a heat transport medium excellent in fluidity and transportability.

(16) The heat transport medium of the present invention is characterized in that the tri-n-butyl-n-pentylammonium bromide according to any one of (13) to (15) is synthesized from tributylamine and 1-bromopentane.

(17) The heat transport medium of the present invention is characterized in that the tri-n-butyl-n-pentylammonium chloride according to any one of (13) to (15) is synthesized by exchanging bromine of tri-n-butyl-n-pentylammonium bromide synthesized from tributylamine and 1-bromopentane for chlorine by anion exchange resin.

(18) A cold insulation agent according to the present invention is characterized by comprising a tri-n-butylalkylammonium salt and water.

(19) A cold insulation agent according to the present invention is characterized by comprising either tri-n-butyl-n-pentylammonium bromide or tri-n-butyl-n-pentylammonium chloride and water.

(20) A cold insulation agent according to the present invention is characterized by comprising tri-n-butyl-n-pentylammonium bromide hydrate or tri-n-butyl-n-pentylammonium chloride hydrate as a main component.

The concentration at which tri-n-butyl-n-pentylammonium bromide forms a clathrate hydrate and gives a congruent melting point is 34% by weight and the congruent melting point thereof is about 6° C. The latent heat quantity at the congruent melting point is 193 J/g and thus the clathrate hydrate has a high latent heat quantity. The specific heat of an aqueous solution in which the hydrate is melted is 3.7 J/g·K and due to the high specific heat, the temperature of the hydrate is hardly increased. Further, even if freezing and melting are repeated, phase separation or deterioration of the heat storage performance is not caused. Owing to such characteristics, the hydrate is preferably usable as a cold insulation agent for an object to be cooled having a proper cooling temperature in a range higher than 0° C. to lower than 10° C.

The concentration at which tri-n-butyl-n-pentylammonium chloride forms a clathrate hydrate and gives a congruent melting point is 33% by weight and the congruent melting point is about 9° C. The latent heat quantity at the congruent melting point is 195 J/g and thus the clathrate hydrate has a high latent heat quantity. The specific heat of an aqueous solution in which the hydrate is melted is 3.7 J/g·K and due to the high specific heat, the temperature of the hydrate is hardly increased. Further, even if freezing and melting are repeated, phase separation or deterioration of the heat storage performance is not caused. Owing to such characteristics, the hydrate is preferably usable as a cold insulation agent for an object to be cooled having a proper cooling temperature in a range higher than 0° C. to lower than 10° C.

(21) A cold insulation agent according to the present invention is characterized by comprising either tri-n-butyl-n-pentylammonium bromide or tri-n-butyl-n-pentylammonium chloride, tetra-n-butylammonium bromide, and water.

(22) A cold insulation agent according to the present invention is characterized by comprising either tri-n-butyl-n-pentylammonium bromide hydrate or tri-n-butyl-n-pentylammonium chloride hydrate and tetra-n-butylammonium bromide hydrate as main components.

When the tetra-n-butylammonium bromide which forms a hydrate having a different melting point from that of tri-n-butyl-n-pentylammonium bromide hydrate or tri-n-butyl-n-pentylammonium chloride hydrate and either one of tri-n-butyl-n-pentylammonium bromide and tri-n-butyl-n-pentylammonium chloride are mixed with water, it is possible to make the temperature (melting point of a mixture) at which the hydrate is produced by cooling the resultant aqueous solution mixture lower or higher than the melting point of tri-n-butyl-n-pentylammonium bromide hydrate or tri-n-butyl-n-pentylammonium chloride hydrate alone.

Accordingly, it is possible that the melting point of a mixture containing tetra-n-butylammonium bromide with tri-n-butyl-n-pentylammonium bromide or tri-n-butyl-n-pentylammonium chloride can be adjusted in a desired range by adjusting the mixing composition of the mixture. Therefore, it is possible to provide a cold insulation agent having a melting point suitable for a proper cooling temperature desirable for an object to be cooled.

It has been confirmed that the total latent heat quantity of the mixture is approximately the total heat quantity calculated by multiplying the respective latent heat quantities of tetra-n-butylammonium bromide and either tri-n-butyl-n-pentylammonium bromide hydrate or tri-n-butyl-n-pentylammonium chloride hydrate by their composition ratios.

(23) The cold insulation agent of the present invention is characterized in that the tri-n-butyl-n-pentylammonium bromide according to any one of (19) to (22) is synthesized from tributylamine and 1-bromopentane.

(24) The cold insulation agent of the present invention is characterized in that the tri-n-butyl-n-pentylammonium chloride according to any one of (19) to (22) is synthesized by exchanging bromine of tri-n-butyl-n-pentylammonium bromide synthesized from tributylamine and 1-bromopentane for chlorine by anion exchange resin.

(25) A cold insulator according to the present invention is characterized in that the cold insulation agent according to any one of (18) to (24) is packed in a container or a bag body.

As the container or bag body for packing the cold insulation agent in, conventionally employed and known containers or bag bodies for a cold insulation agent may be used. Examples thereof are bag bodies and containers (e.g., bags and packs containing jelly beverage or shampoo for refilling) made of sheets of flexible materials such as synthetic resin films laminated with metal foil (e.g., aluminum foil) and plastic formed containers.

A cold insulation agent is packed in a plastic container or bag body to produce a cold insulator, which is previously cooled and stored together with an object to be cooled in a cold insulation container for distribution and storage.

(26) A melting point control agent for a heat storage agent according to the present invention is characterized by comprising a tri-n-butylalkylammonium salt.

The tri-n-butylalkylammonium salt which forms a hydrate having a different melting point from that of a heat storage main agent may be used as a melting point control agent.

Preparation of a Heat Storage Agent by Adding the tri-n-butylalkylammonium salt or its aqueous solution to a heat storage main agent makes the temperature (melting point of a mixture) at which the hydrate is produced by cooling the resultant heat storage agent lower or higher than the melting point of the heat storage main agent alone. Accordingly, it is possible that the melting point of a mixture containing the tri-n-butylalkylammonium salt or its aqueous solution can be adjusted in a desired range by adjusting the addition ratio. Therefore, it is possible to provide a heat storage agent having a melting point suitable for an object to be cooled by the heat storage agent or heat storage temperature required in accordance with the purpose of heat storage.

Examples of the heat storage main agent to which a tri-n-butylalkylammonium salt is added as a melting point control agent are preferably tetraalkylammonium compound hydrates since these hydrates are analogous substances. Examples of the tetraalkylammonium compound may be tetraalkylammonium-anion salts.

Examples of the anion may be Br, F, Cl, $C_2H_5COO$, OH, $CH_3COO$, HCOO, $CH_3SO_3$, $CO_3$, $PO_4$, $HPO_4$, $WO_4$, i-$C_3H_7COO$, $O_3S(CH_2)_2SO_3$, s-$C_4H_9COO$, $NO_3$, $(CH_3)_2CH(NH_2)_2COO$, n-$C_3H_7SO_3$, $CF_3COO$, $CrO_3$, and $SO_4$.

Examples of the alkyl may include n-butyl, iso-butyl, n-pentyl, iso-pentyl, n-propyl, iso-propyl, ethyl, methyl, n-hexyl, iso-hexyl, n-heptyl, iso-heptyl, and iso-butyl.

Specific examples of the tetraalkylammonium-anion salts may include tetra-n-butylammonium bromide.

Since the total latent heat quantity of the heat storage agent prepared by adding a tri-n-butylalkylammonium salt as a melting point control agent to a heat storage main agent is approximately equal to the total of the respective latent heat quantities of the heat storage main agent and the tri-n-butylalkylammonium salt, the melting point can be adjusted without lowering the latent heat quantity of the heat storage agent by adding the melting point control agent.

(27) A melting point control agent for a heat storage agent according to the present invention is characterized by comprising tri-n-butyl-n-pentylammonium bromide or tri-n-butyl-n-pentylammonium chloride.

Addition of tri-n-butyl-n-pentylammonium bromide or tri-n-butyl-n-pentylammonium chloride to a heat storage main agent containing, for example, a tetraalkylammonium compound hydrate makes the temperature (melting point of the mixture) at which the hydrate is produced lower or higher than the melting point of the heat storage main agent alone.

(28) A supercooling preventive agent for a heat storage agent according to the present invention is characterized by comprising a tri-n-butylalkylammonium salt.

When a proper amount of the tri-n-butylalkylammonium salt or its aqueous solution is added to a heat storage main agent, supercooling of the heat storage main agent can be efficiently prevented. In the case the heat storage main agent is, for example, a tetraalkylammonium compound hydrate, since the tri-n-butylalkylammonium salt is an analogous substance of the heat storage main agent, the tri-n-butylalkylammonium salt has efficient supercooling-preventive ability. That is, if an aqueous solution obtained by adding the tetraalkylammonium compound heat storage main agent and, as a supercooling preventive agent, either the tri-n-butylalkylammonium salt with a higher melting point than that of the heat storage main agent or its aqueous solution is cooled, a hydrate of the tri-n-butylalkylammonium salt, the supercooling preventive agent, is first produced and works as a nucleus for production of a hydrate of the heat storage main agent to prevent supercooling.

Since the tri-n-butylalkylammonium salt as a supercooling preventive agent, is an analogous substance of the tetraalkylammonium compound as a heat storage main agent, the tri-n-butylalkylammonium salt is evenly dispersed and therefore has a high supercooling preventive ability, and can maintain the supercooling preventive ability without being separation even after the heat storage agent is repeatedly frozen and melted.

(29) A supercooling preventive agent for a heat storage agent according to the present invention is characterized by comprising tri-n-butyl-iso-pentylammonium bromide or tri-n-butyl-n-pentylammonium chloride.

Addition of tri-n-butyl-isopentylammonium bromide or tri-n-butyl-n-pentylammonium chloride to a heat storage main agent containing, for example, a tetraalkylammonium compound hydrate prevents supercooling of the heat storage agent.

In the case the heat storage main agent is a tetraalkylammonium compound hydrate, if tri-n-butyl-isopentylammonium bromide or tri-n-butyl-n-pentylammonium chloride is used as the supercooling preventive agent, tri-n-butyl-isopentylammonium bromide or tri-n-butyl-n-pentylammonium chloride is evenly dispersed and therefore has a high supercooling-preventive ability, and can maintain the supercooling-preventive ability without being separation even after the heat storage agent is repeatedly frozen and melted since tri-n-butyl-isopentylammonium bromide or tri-n-butyl-n-pentylammonium chloride is an analogous substance of the heat storage main agent.

(30) A method for producing a main agent of a heat storage agent, a heat transport medium, or a cold insulation agent of the present invention is characterized by comprising: synthesizing tri-n-butyl-n-pentylammonium bromide from tributylamine and 1-bromopentane; and using this as the main agent of the heat storage agent, the heat transport medium, or the cold insulation agent.

It has been found possible to synthesize tri-n-butyl-n-pentylammonium bromide by causing a reaction of tri-n-butylamine and 1-bromopentane in a proper solvent according to the following reaction formula:

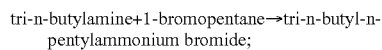

tri-n-butylamine+1-bromopentane→tri-n-butyl-n-pentylammonium bromide;

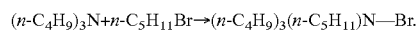

$(n\text{-}C_4H_9)_3N + n\text{-}C_5H_{11}Br \rightarrow (n\text{-}C_4H_9)_3(n\text{-}C_5H_{11})N\text{---}Br.$ That is, since tri-n-butyl-n-pentylammonium bromide can be synthesized by one-step synthesis process as in the abovementioned formula, the synthesis cost can be lowered.

(31) A method for producing a main agent of a heat storage agent, a heat transport medium, or a cold insulation agent of the present invention is characterized by comprising: synthesizing tri-n-butyl-n-pentylammonium bromide from tributylamine and 1-bromopentane; synthesizing tri-n-butyl-n-pentylammonium chloride by exchanging bromine of tri-n-butyl-n-pentylammonium bromide for chlorine by anion exchange resin; and using this as the main agent of a heat storage agent, a heat transport medium, or a cold insulation agent.

It has been found possible to synthesize tri-n-butyl-n-pentylammonium bromide by causing a reaction of tri-n-butylamine and 1-bromopentane in a proper solvent according to the following reaction formula:

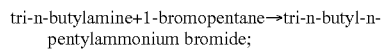

tri-n-butylamine+1-bromopentane→tri-n-butyl-n-pentylammonium bromide;

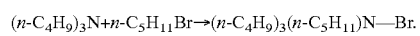

$(n\text{-}C_4H_9)_3N + n\text{-}C_5H_{11}Br \rightarrow (n\text{-}C_4H_9)_3(n\text{-}C_5H_{11})N\text{---}Br.$ Further, it has been found possible to synthesize tri-n-butyl-n-pentylammonium chloride by bringing an aqueous solution of tri-n-butyl-n-pentylammonium bromide into contact with an anion exchange resin to exchange bromine of tri-n-butyl-n-pentylammonium bromide for chlorine.

That is, since tri-n-butyl-n-pentylammonium chloride can be easily synthesized by ion exchange of tri-n-butyl-n-pentylammonium bromide synthesized as described by one-step synthesis process, the synthesis cost can be lowered.

BEST MODE FOR CARRYING OUT THE INVENTION

Tri-n-Butyl-n-Pentylammonium Bromide

Figure 1:
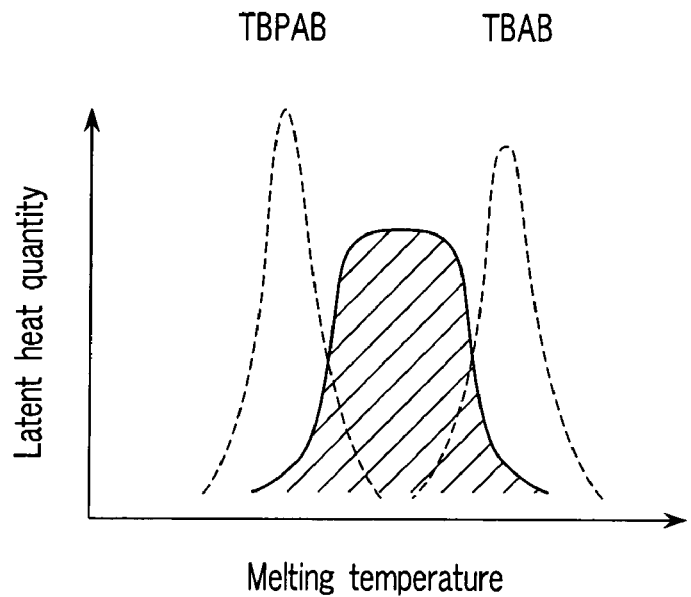
FIG. 1 is a graph of the melting temperature and the latent heat quantity of an aqueous solution mixture containing tri-n-butyl-n-pentylammonium bromide (TBPAB) and tetra-n-butylammonium bromide (TBAB) according to one embodiment of the present invention.

As a tri-n-butylalkylammonium salt, tri-n-butyl-n-pentylammonium bromide and tri-n-butyl-n-pentylammonium chloride will be explained.

Tri-n-butyl-n-pentylammonium bromide and tri-n-butyl-n-pentylammonium chloride were produced by production methods as described below and purified, and then their aqueous solutions with a concentration of 30 wt % to 50 wt % were obtained. Each aqueous solution was subjected to measurement for melting point of the hydrate and latent heat quantity by a differential scanning calorimeter (DSC). As a result, in a phase diagram showing the melting point in the ordinate axis and concentration in the abscissa axis, the melting point became the maximum at 34 wt % in the case of tri-n-butyl-n-pentylammonium bromide and accordingly, it was confirmed that the concentration which gives the congruent melting point (hereinafter, referred to as a congruent concentration) is 34 wt %. The congruent melting point was 6° C., and the latent heat quantity was 193 J/g. In the case of tri-n-butyl-n-pentylammonium chloride, the melting point became the maximum at a concentration of 33 wt % and accordingly, it was confirmed that the concentration which gives the congruent melting point (hereinafter, referred to as a congruent concentration) is 33%. The congruent melting point was 9° C. and the latent heat quantity was 195 J/g.

For comparison, the respective congruent melting points and latent heat quantities at the congruent concentrations of tetra-n-butylammonium nitrate hydrate and tetra-n-butylammonium bromide hydrate, which are conventionally known heat storage agents described in Background Art, and tri-n-butyl-n-pentylammonium bromide hydrate and tri-n-butyl-n-pentylammonium chloride hydrate as embodiments of the present invention are shown in Table 1.

TABLE 1

| Heat storage agent | Congruent melting point (° C.) | Latent heat quantity (J/g) |
|---|---|---|
| Tri-n-butyl-n-pentylammonium bromide hydrate | 6 | 193 |
| Tri-n-butyl-n-pentylammonium chloride hydrate | 9 | 195 |
| Tetra-n-butylammonium nitrate hydrate | 6.5 | 176 |
| Tetra-n-butylammonium bromide hydrate | 12 | 176 |

As shown in Table 1, the congruent melting point of the tri-n-butyl-n-pentylammonium bromide hydrate is 6° C., the lowest, and the latent heat quantity thereof is higher than those of tetra-n-butylammonium nitrate hydrate and tetra-n-butylammonium bromide hydrate, which are conventionally known heat storage agents, and therefore it is understood that the tri-n-butyl-n-pentylammonium bromide hydrate has excellent properties as a heat storage agent or a heat transport medium.

Further, the congruent melting point of the tri-n-butyl-n-pentylammonium chloride hydrate is 9° C., lower than that of tetra-n-butylammonium bromide hydrate, and the latent heat quantity thereof is higher than those of tetra-n-butylammonium nitrate hydrate and tetra-n-butylammonium bromide hydrate and therefore it is understood that the tri-n-butyl-n-pentylammonium chloride hydrate has excellent properties as a heat storage agent or a heat transport medium.

(Production Method)

Next, a method for producing and purifying tri-n-butyl-n-pentylammonium bromide will be explained.

At first, the production and purification steps will be described and thereafter, a specific example will be described.

1. Starting Material Loading Step

Tri-n-butylamine (TBA), 1-bromopentane (PB), and solvent (acetonitrile) are loaded to a container.

2. Reaction Step

Under a normal pressure, a reaction is caused at a temperature of 80 to 85° C. in inert gas atmosphere while a slight amount of argon gas is flowed.

3. Concentration Step

After the reaction, the reaction solution is heated to evaporate TBA, PB, and acetonitrile and concentrate the product. The concentration step may be carried out under a reduced pressure to improve the efficiency.

4. Purification Step

Water is added to the concentrated solution to separate the solution into an oil layer and a water layer and the oil layer is removed. The resultant water layer is mixed with cyclohexene for washing and an oil layer is removed. Further, the resultant water layer is again mixed with n-hexane for washing and an oil layer is removed. The remaining solvent and starting materials are removed by the above-mentioned washing. The purity of tri-n-butyl-n-pentylammonium bromide in an aqueous solution of tri-n-butyl-n-pentylammonium bromide obtained by purifying in the above-mentioned manner becomes 99%.

An example of tri-n-butyl-n-pentylammonium bromide production carried out actually by the above-mentioned production process will be described below.

After 278 g of tri-n-butylamine, 249 g of 1-bromopentane, and 400 g of acetonitrile as a solvent were loaded to a reaction container, a reaction was carried out at a refluxing temperature (80 to 85° C.) for 22 hours under a normal pressure while a slight amount of argon was flowed.

After the reaction, the reaction solution was concentrated at about 30° C. under a reduced pressure to remove the starting materials and solvent to concentrate the product.

The resultant concentrated solution was mixed with 400 g of water to separate the solution into an oil layer and a water layer and the oil layer was removed.

After the resultant water layer was mixed with 300 g of cyclohexane and washed, an oil layer was removed. Further, after the remaining water layer was mixed with 300 g of n-hexane and washed, an oil layer was removed.

The resultant water layer was analyzed to find that an aqueous solution containing 53 wt % of tri-n-butyl-n-pentylammonium bromide was obtained. The yield was 86%.

When the purity of the product excluding water was measured, it was 99%. Although not described in this example, it is needless to say that the reaction rate can be increased by increasing the reaction pressure and temperature.

Purification may be carried out as follows in place of the manner described in "4. Purification step".

Ethyl acetate is added as a solvent to the concentrated solution and the entire mixed solution is made uniform by heating if necessary. The resultant solution is cooled to 30° C. or lower and further a very slight amount of a solid powder of tri-n-butyl-n-pentylammonium bromide is added to precipitate tri-n-butyl-n-pentylammonium bromide by recrystallization. The crystal is obtained by filtration and dried, and the remaining impurities such as the solvent are removed to purify the tri-n-butyl-n-pentylammonium bromide with a purity of 99% or higher. If the recrystallization is carried out at 5° C. or lower, it is more preferable in terms of yield and efficiency.

Next, a method for producing and purifying tri-n-butyl-n-pentylammonium chloride will be described.

At first, the production and purification steps will be described and thereafter, a specific example will be described.

1. Starting Material Loading Step

Tri-n-butylamine (TBA), 1-bromopentane (PB), and solvent (acetonitrile) are loaded to a container.

2. Reaction Step

Under a normal pressure, a reaction is caused at a temperature of 80 to 85° C. in inert gas atmosphere to synthesize tri-n-butyl-n-pentylammonium bromide while a slight amount of argon gas is flowed.

3. Concentration Step

After the reaction, the reaction solution is heated to evaporate TBA, PB, and acetonitrile and concentrate the product. The concentration step may be carried out under a reduced pressure to improve the efficiency.

4. Purification Step

Water is added to the concentrated solution to separate the solution into an oil layer and a water layer and the oil layer is removed. The resultant water layer is mixed with cyclohexene for washing and an oil layer is removed. Further, the resultant water layer is again mixed with n-hexane for washing and an oil layer is removed. The remaining solvent and starting materials are removed by the above-mentioned washing. The purity of tri-n-butyl-n-pentylammonium bromide in an aqueous solution of tri-n-butyl-n-pentylammonium bromide obtained by purification in the above-mentioned manner becomes 99%.

5. Ion Exchange Step

The aqueous tri-n-butyl-n-pentylammonium bromide solution obtained by the purification is passed through an anion exchange reason layer to exchange bromine for chlorine and produce tri-n-butyl-n-pentylammonium chloride.

An example of tri-n-butyl-n-pentylammonium chloride production carried out actually by the above-mentioned production process will be described below.

After 278 g of tri-n-butylamine, 249 g of 1-bromopentane, and 400 g of acetonitrile as a solvent were loaded to a reaction container, a reaction was carried out at a refluxing temperature (80 to 85° C.) for 22 hours under a normal pressure while a slight amount of argon was flowed.

After the reaction, the reaction solution was concentrated at about 30° C. under a reduced pressure to remove the starting materials and solvent to concentrate the product.

The resultant concentrated solution was mixed with 400 g of water to separate the solution into an oil layer and a water layer and the oil layer was removed.

After the resultant water layer was mixed with 300 g of cyclohexane and washed, an oil layer was removed. Further, after the remaining water layer was mixed with 300 g of n-hexane and washed, an oil layer was removed. The yield of the produced tri-n-butyl-n-pentylammonium bromide was 86%. When the purity of the product excluding water was measured, it was 99%. Although not described in this example, it is needless to say that the reaction rate can be increased by increasing the reaction pressure and temperature.

The water layer containing the resultant tri-n-butyl-n-pentylammonium bromide was passed through an ion exchange apparatus filled with a basic anion exchange resin (Amberlite IRA 400 JCL, manufactured by Rohm and Haas Co.) at a normal temperature.

When the resultant water layer was analyzed by ion chromatography, bromine was almost completely exchanged for chlorine and it was found to be an aqueous solution of tri-n-butyl-n-pentylammonium chloride.

The corrosiveness of tri-n-butyl-n-pentylammonium bromide was evaluated.

After a carbon steel plate or an aluminum plate was immersed in an aqueous solution containing 34 wt % of tri-n-butyl-n-pentylammonium bromide at 90° C. for 1 week, the weight loss was measured and converted into the corrosion speed.

The corrosion speed of an aqueous solution containing 36 wt % of tetra-n-butylammonium nitrate, which is approximately the congruent concentration, was measured in the same manner.

The results are shown in Table 2.

TABLE 2

| | Corrosion speed (mm/y) | |
|---|---|---|
| Heat storage agent | Carbon steel | Aluminum |
| Tri-n-butyl-n-pentylammonium bromide | 0.02 | Under measurement limit |
| Tetra-n-butylammonium nitrate | 0.1 | 0.6 |

As can be seen from Table 2, tri-n-butyl-n-pentylammonium bromide is much less corrosive than tetra-n-butylammonium nitrate to carbon steel and scarcely or not at all corrosive to aluminum.

The characteristics and applications of a heat storage agent or a heat transport medium containing tri-n-butyl-n-pentylammonium bromide hydrate as a main component according to the present invention will be described below.

(1) Correlation Between Purity and Latent Heat Quantity

The relation between the purity of tri-n-butyl-n-pentylammonium bromide and the hydrate latent heat quantity was investigated.

In the case where production was carried out without the washing with the organic solvent during the purification step of the above production and purification steps, the purity of the tri-n-butyl-n-pentylammonium bromide was 94%. The crude product and the purified product were mixed to produce tri-n-butyl-n-pentylammonium bromide with a purity of 94 to 99% and the latent heat quantities of respective hydrates were measured. The measurement results are shown in Table 3.

TABLE 3

| Purity (%) | Latent heat quantity (J/g) |
|---|---|
| 94 | 172 |
| 95 | 172 |
| 96 | 173 |
| 97 | 186 |
| 98 | 190 |
| 99 | 193 |

As shown in Table 3, it was found that the latent heat quantity of the tri-n-butyl-n-pentylammonium bromide hydrate differs depending on the purity of tri-n-butyl-n-pentylammonium bromide. That is, tri-n-butyl-n-pentylammonium bromide with a higher purity (less impurity) gives higher latent heat quantity than tri-n-butyl-n-pentylammonium bromide with a lower purity (more impurity). It was found that if impurities such as starting materials or solvent remaining in the product are contained to a certain extent or more, it is impossible to obtain a sufficient latent heat quantity and therefore it is very important to sufficiently remove impurities. In particular, as shown in Table 3, it was made apparent if the purity is made to be 97% or higher, the latent heat quantity higher than that with less purity can be assured.

The reason for the decrease of the latent heat quantity by the impurities is supposed to be not only because physical contamination with the impurities decreases the ratio of the hydrate of the pure substance but also because the impurities cause chemical action on the hydrate to decrease the latent heat quantity. In the case of those with 96% or less purity in Table 3, it is estimated that the latter chemical action becomes significant to considerably decrease the latent heat quantity. A substance which decreases the latent heat quantity by such chemical action may be those which can form hydrogen bond affecting the crystal structure of the hydrate. Such a substance may be a cause of instability or change of the structure of water of the hydrate formed in a cage-like form by hydrogen bond to decrease the latent heat quantity. The substance which decreases the latent heat quantity by the chemical action may be an ion-containing substance which causes an effect on the crystal structure of the hydrate, besides the above-mentioned substances. Such a substance may become a cause which affects the bonding state of the bromide ion and tri-n-butyl-n-pentylammonium ion of the tri-n-butyl-n-pentylammonium bromide, which constitute the hydrate.

(2) Melting Point Control

Since it has been found that the melting point can be adjusted by mixing tri-n-butyl-n-pentylammonium bromide and a tetraalkylammonium compound, its detail will be described below.

The melting point and the latent heat quantity of an aqueous solution mixture, containing respective aqueous solutions having congruent concentrations of tri-n-butyl-n-pentylammonium bromide (TBPAB) and tetra-n-butylammonium bromide (TBAB) as an example of tetraalkylammonium compound at the equimolecular ratio, were measured. FIG. 1 is a graph showing the measurement result. The latent heat quantity is shown in the ordinate axis and the melting temperature is shown in the abscissa axis.

As can be seen from FIG. 1, the hydrate produced from the aqueous solution mixture was found to melt at a temperature between the respective melting temperatures of solely the tri-n-butyl-n-pentylammonium bromide hydrate and solely the tetra-n-butylammonium bromide hydrate. Further, the total latent heat quantity of the mixture was found to be approximately the same as the total of the latent heat quantities of the respective hydrates.

As described, addition of a tetraalkylammonium compound which forms a hydrate with a different melting point from that of the tri-n-butyl-n-pentylammonium bromide hydrate enables to make the temperature (melting point of a mixture) at which the hydrate is produced by cooling the aqueous solution mixture lower or higher than the melting point of tri-n-butyl-n-pentylammonium bromide hydrate alone.

Accordingly, it is possible that the melting point of a mixture containing the tetraalkylammonium compound with tri-n-butyl-n-pentylammonium bromide can be adjusted in a desired range by adjusting the mixing composition of the mixture. Therefore, it is possible to provide a heat storage agent having a melting point suitable for heat storage temperature required in accordance with an object to be cooled by the heat storage agent and the purpose of heat storage.

Since use of a mixture of different hydrates widens the temperature range of using the latent heat of the hydrate mixture, the mixture is suitable for uses requiring latent heat in a wide temperature range. Further, even if the condition in cooling fluctuates slightly due to the ambient conditions or other reasons (e.g., the case where the temperature is not decreased sufficiently in cooling), certain latent heat storage can be accomplished.

In the above-mentioned case, a tetraalkylammonium compound is employed for controlling the melting point of tri-n-butyl-n-pentylammonium bromide, but instead a tri-n-butylalkylammonium salt may be used.

Examples of the alkyl may include n-pentyl, iso-pentyl, n-propyl, iso-propyl, ethyl, methyl, n-hexyl, iso-hexyl, n-heptyl, iso-heptyl, and iso-butyl, other than n-butyl.

Examples of the ammonium salt may include ammonium bromide, ammonium fluoride, ammonium chloride, ammonium nitrate, ammonium nitrite, ammonium chlorate, ammonium perchlorate, ammonium bromate, ammonium iodate, ammonium carbonate, ammonium phosphate, ammonium tungstate, ammonium sulfate, ammonium hydroxide, ammonium carboxylate, ammonium dicarboxylate, ammonium sulfonate, and ammonium disulfonate.

Further, the concentration of tri-n-butyl-n-pentylammonium bromide in the aqueous solution may be adjusted to be higher or lower than the concentration at which the congruent melting point is obtained (the congruent concentration), by which the melting point can be adjusted. When the concentration is made lower or higher than the congruent concentration, the melting point becomes lower than the congruent melting point. When an aqueous solution with a concentration lower than the congruent concentration is cooled to produce a hydrate, as the production proceeds, the concentration of the aqueous solution is decreased to gradually lower the melting point. In the case where the concentration is made lower than the congruent concentration, the hydration number of hydrates to be produced is sometimes increased. In this case, the latent heat quantity is increased due to the increase of the hydration number.

(3) Supercooling Prevention

The state that an aqueous solution for a hydrate production is cooled to a hydrate production temperature (melting point) but no hydrate is produced yet and the aqueous solution is kept in the phase as it is even after the solution is further cooled is called supercooling state. In the case of using a hydrate for a heat storage agent, if the supercooling is significant, it becomes a problem that the refrigerant temperature has to be lowered for cooling the aqueous solution. Accordingly, it is important to make the supercooling as slight as possible and thus suppress the supercooling.

A supercooling preventive agent to be added to a heat storage agent according to the present invention is preferably a tetraalkylammonium compound which forms a hydrate having a melting point higher than that of tri-n-butylalkylammonium salt hydrate, a heat storage main agent, by at least 5° C.

When a tetraalkylammonium compound which forms a hydrate having a melting point higher than that of a heat storage main agent by at least 5° C. is added to the heat storage main agent as a supercooling preventive agent, the hydrate of the tetraalkylammonium compound is produced at first to give a nucleus for the hydrate formation of the heat storage main agent. If the difference in the melting points is smaller than 5° C., the supercooling preventive effect cannot be obtained sufficiently.

Since the tetraalkylammonium compound is an analogous substance of tri-n-butylalkylammonium salt, the heat storage main agent, it has the supercooling preventive ability. That is, when an aqueous solution containing a tri-n-butylalkylammonium salt heat storage main agent and a supercooling preventive agent is cooled, at first the hydrate of the supercooling preventive agent is produced and the hydrate works as a nucleus for production of the hydrate of the heat storage main agent to prevent the supercooling.

The supercooling preventive agent is preferably a tetraalkylammonium compound which produces a hydrate at a temperature higher than the hydrate production temperature of an aqueous solution containing tri-n-butylalkylammonium salt, the heat storage main agent, in a properly set concentration. This is because when an aqueous solution containing heat storage main agent and a supercooling preventive agent is cooled, at first the hydrate of the supercooling preventive agent is produced and accordingly, the supercooling preventive effect is caused.

With respect to the addition amount of the supercooling preventive agent, it is preferable to add 1 to 20% by weight of the supercooling preventive agent to the heat storage main agent and accordingly supercooling can be reliably prevented. If the addition amount is lower than 1%, the effect of preventing supercooling by forming a nucleus for hydrate production of the heat storage main agent is insufficient. On the other hand, if the addition amount exceeds 20%, the melting point of the mixture of the heat storage main agent and the supercooling preventive agent is affected and increased, resulting in undesirable consequence.

In the case the heat storage main agent is, for example, tri-n-butyl-n-pentylammonium bromide, tetrabutylammonium fluoride is added as a supercooling preventive agent. Tetrabutylammonium fluoride hydrate has a congruent melting point of 25° C. and is capable of efficiently preventing supercooling. Further, addition of disodium hydrogen phosphate as a supercooling preventive agent is also effective to prevent supercooling, and combination use of tetrabutylammonium fluoride and disodium hydrogen phosphate as supercooling preventive agents further efficiently prevents supercooling.

Hereinafter, a proper addition ratio of a supercooling preventive agent will be discussed and described in detail.

The following case has been discussed: a heat storage agent obtained by adding tetra-n-butylammonium fluoride as a supercooling preventive agent to tri-n-butyl-n-pentylammonium bromide as a cold insulation main agent is used for a cooling air conditioning.

In many cases, the temperature of cooling air to be blown from an indoor equipment is generally 15° C. and no higher than 18° C. in the cooling air conditioning. If it is higher than that temperature, unless the air blowing quantity to the space to be air-conditioned is increased, it is difficult to cause the air conditioning effect to the same level and rather, the air conditioning efficiency is decreased. Therefore, the latent heat storage agent which supplies cold to the cooling air is required to be those which can store latent heat at 16° C. or lower in consideration of the temperature difference (about 2° C.) needed for heat exchange with air.

In the case of ice, a typical example of a latent heat storage agent for air conditioning, since it is required to be cooled at 0° C. or lower, there is a problem that COP of a refrigerator is lowered and accordingly the energy needed for cooling becomes so high to make energy saving difficult. To keep COP high as it is and to save energy, the latent heat storage agent for air conditioning is required to be those which can store heat at 5° C. or higher and at lowest 3° C. or higher. For the above-mentioned reasons, it is desired to make a latent heat storage agent for air conditioning which can store heat at a temperature in the range of 3° C. to 16° C. available.

The tri-n-butyl-n-pentylammonium bromide hydrate has a melting point of 6° C. and is suitable as a heat storage agent for cooling air conditioning. Then, a heat storage agent obtained by additionally adding tetra-n-butylammonium fluoride as a supercooling preventive agent has been discussed. With respect to heat storage agents obtained by adding an aqueous tetra-n-butylammonium fluoride solution with a congruent concentration at several weight ratios in the range of 0 to 20% to an aqueous tri-n-butyl-n-pentylammonium bromide solution with a congruent concentration, the supercooling releasing capability and latent heat quantity in a temperature range of 3° C. to 16° C. are investigated and the results are shown in Table 4.

The latent heat quantity is measured by a differential scanning calorimeter (DSC) in a temperature range of 3° C. to 16° C. Further, to investigate the alteration of the latent heat quantity, the ratio of the latent heat quantity to that of a heat storage agent containing no supercooling preventive agent is shown as the latent heat quantity ratio. The melting point is also shown, which is defined as the peak value of the graph showing the temperature in the abscissa axis and specific heat in the ordinate axis in the DSC measurement results. Further, with respect to the supercooling preventive capability, ○ is assigned in the case the heat storage agent satisfies the following conditions: that the hydrate crystal growth is confirmed within several minutes after cooling to 3° C.; that hydrate crystal growth rate is increased as compared with that of the case using no supercooling preventive agent; and that the supercooling preventive capability is not lowered even after freezing and melting are repeated 1000 times, and X is assigned in the case the heat storage agent fails to satisfy the above-mentioned conditions.

TABLE 4

| | Addition ratio (%) | | | | | | |
|---|---|---|---|---|---|---|---|
| | 0 | 2 | 4 | 7 | 12 | 16 | 20 |
| Latent heat quantity (J/g) | 193.1 | 194.0 | 189.7 | 191.3 | 191.3 | 191.4 | 170.9 |
| Latent heat quantity ratio | 1.00 | 1.00 | 0.98 | 0.99 | 0.99 | 0.99 | 0.89 |

TABLE 4-continued

| | Addition ratio (%) | | | | | |
|---|---|---|---|---|---|---|
| | 0 | 2 | 4 | 7 | 12 | 16 | 20 |
| Melting point (° C.) | 5.7 | 5.6 | 6.1 | 5.8 | 6.2 | 6.1 | 7.8 |
| Supercooling releasing capability | X | X | X | ○ | ○ | ○ | ○ |

The latent heat quantity ratio is considerably decreased if the addition ratio of the aqueous tetra-n-butylammonium fluoride solution with the congruent concentration exceeds 20%, but if the addition ratio is up to 16%, the decrease of the latent heat quantity ratio is little. The supercooling releasing capability is insufficient if the addition ratio is 4% or lower. Accordingly, it is preferable to adjust in the range of 7 to 16% for the addition amount of the aqueous tetra-n-butylammonium fluoride solution with the congruent concentration at which latent heat quantity is not decreased and the supercooling releasing capability is sufficient even if the difference between the cooling temperature and the melting point is about 3° C.

Further, although addition of the aqueous tetra-n-butylammonium fluoride solution with the congruent concentration is exemplified, the same supercooling releasing effect can be caused even in the case of adding a powder of tetra-n-butylammonium fluoride trihydrate.

Examples of a tetraalkylammonium compound suitable for the supercooling preventive agent, other than tetra-n-butylammonium fluoride, include the following compounds having a melting point higher than that of a heat storage main agent:

$(i-C_5H_{11})_4N-F$, $(i-C_5H_{11})_4N-Cl$, $(i-C_5H_{11})_4N-C_2H_5COO$, $(n-C_4H_9)_4N-OH$, $(i-C_5H_{11})_4N-CH_3COO$, $(i-C_5H_{11})_4N-HCOO$, $(i-C_5H_{11})_4N-CH_3SO_3$, $((n-C_4H_9)_4N)_2-CO_3$, $((n-C_4H_9)_4N)_3-PO_4$, $((n-C_4H_9)_4N)_2-HPO_4$, $(n-C_4H_9)_4N-Cl$, $((n-C_4H_9)_4N)_2-WO_4$, and $(n-C_4H_9)_4N-Br$.

Supercooling can be also prevented efficiently by adding 0.1 to 2% by weight of disodium hydrogen phosphate as a supercooling preventive agent in the case of using tri-n-butyl-n-pentylammonium bromide as a heat storage main agent, and combination use of tetrabutylammonium fluoride and disodium hydrogen phosphate as supercooling preventive agents further efficiently prevents supercooling.

(4) Corrosion Suppression

Although tri-n-butyl-n-pentylammonium bromide is remarkably less corrosive than tetra-n-butylammonium nitrate, it is corrosive to carbon steel since it contains bromide ion and therefore, it is preferable to add a corrosion inhibitor for suppressing corrosion.

Examples of the corrosion inhibitor may include sodium salts and lithium salts of sulfurous acid, thiosulfuric acid, and nitrous acid and addition thereof to the heat storage agent consumes dissolved oxygen and suppresses corrosion (referred to as a deoxidizing type corrosion inhibitor).

Further, examples of another corrosion inhibitor may include sodium salts, potassium salts, calcium salts, and lithium salts of polyphosphoric acid, tripolyphosphate, tetrapolyphosphate, hydrogenphosphates, pyrophosphoric acid, and metasilicic acid, which can suppress corrosion by forming a coating preventing corrosion on the metal surface (referred to as a coating formation type corrosion inhibitor). Corrosion can be further suppressed by combination use of the coating formation type corrosion inhibitor with sulfites or thiosulfites, which are the above-mentioned deoxidizing type corrosion inhibitors.

Further, benzotriazole can be exemplified as another corrosion inhibitor.

Addition of the above-mentioned corrosion inhibitor provides a heat storage agent with little corrosiveness without causing significant change of the melting point or the heat storage quantity.

The corrosion inhibiting effect was evaluated by adding a corrosion inhibitor to tri-n-butyl-n-pentylammonium bromide.

Each corrosion inhibitor shown in Table 5 was added to an aqueous tri-n-butyl-n-pentylammonium bromide solution with a congruent concentration, and a carbon steel plate was immersed therein and held at 90° C. for 1 week, after which the weight loss was measured and converted into a corrosion speed. The results are shown in Table 5.

TABLE 5

| Sodium sulfite addition ratio (ppm) | Sodium polyphosphate addition ratio (ppm) | Corrosion speed (mm/year) |
|---|---|---|
| 1000 | None | 0.007 |
| None | 1000 | 0.008 |
| 1000 | 1000 | 0 |
| None | None | 0.02 |

As shown in Table 5, addition of sodium sulfite or addition of sodium polyphosphate suppressed the corrosion speed to ½ or lower as compared with that in the case of no addition, and combination use of sodium sulfite and sodium polyphosphate more sufficiently suppresses corrosion. Further, above-mentioned other corrosion inhibitors are also effective to sufficiently suppress corrosion.

These corrosion inhibitors are effective to suppress corrosion by other tri-n-butylalkylammonium salts.

(5) Heat Transport Medium

An aqueous solution of 15% tri-n-butyl-n-pentylammonium bromide was produced and cooled to 4° C. to produce a hydrate, and hydrate particles were dispersed in the aqueous solution to produce hydrate slurry. The hydrate slurry has a dynamic viscosity approximately the same as that of water, high fluidity and excellent transportability and is thus suitable as a heat transport medium with a high heat storage quantity.

In the case where a tri-n-butylalkylammonium salt such as tri-n-butyl-n-pentylammonium bromide is used as a heat transport medium, it is micro-capsulated by a technique disclosed in Jpn. Pat. Appln. KOKAI Publication No. 7-91872 and may be used in the form of slurry containing the microcapsules.

If necessary, a properly selected surfactant or resistance decreasing agent may be added additionally to perform further resistance decreasing treatment.

Micro-capsulation or addition of a surfactant or a resistance decreasing agent can increase the fluidity, and the pump power for transporting the heat transport medium can be saved.

The melting point control, supercooling prevention, and corrosion suppression of the heat storage agent or the heat transport medium containing tri-n-butyl-n-pentylammonium bromide of the present invention or its hydrate as the main agent have been described as above, and the characteristics of the heat storage agent and the heat transport medium containing tri-n-butyl-n-pentylammonium chloride or its hydrate as the main agent may be the same as described above.

It is needless to say that, not only tri-n-butyl-n-pentylammonium bromide and tri-n-butyl-n-pentylammonium chloride, also other tri-n-butylalkylammonium salts or their aqueous solutions can be used as the heat transport medium.

Examples of other tri-n-butylalkylammonium salts may include tri-n-butyl-isopentylammonium bromide.

Tri-n-butyl-isopentylammonium bromide can be synthesized using tri-n-butylamine and 1-bromo-3-methylbutane as starting materials, by the same method as the method for producing tri-n-butyl-n-pentylammonium bromide.

Aqueous solutions containing tri-n-butyl-iso-pentylammonium bromide in a concentration of 30 wt % to 50 wt % were prepared and the congruent melting point and latent heat quantity of their hydrates were measured to find that the congruent concentration was 33 wt %; congruent melting point was about 17° C.; and latent heat quantity was 227 J/g, which is a high latent heat quantity.

Since an aqueous tri-n-butyl-iso-pentylammonium bromide solution has a congruent melting point of about 17° C., in the case where the hydrate slurry is used as a heat transport medium at 4° C., the concentration of the aqueous solution is adjusted to be lower than the congruent concentration in order to lower the melting point. This concentration adjustment is carried out in such a manner that the concentration of the solution is made lower than that of an aqueous solution of tri-n-butyl-n-pentylammonium bromide in order to adjust the melting point. That is, as compared with a case of using an aqueous solution of tri-n-butyl-n-pentylammonium bromide (congruent melting point of about 6° C.) or an aqueous solution of tetra-n-butylammonium bromide (congruent melting point of about 12° C.) as a heat transport medium, in the case of the aqueous solution of tri-n-butyl-iso-pentylammonium bromide (congruent melting point of 17° C.), the concentration of tri-n-butyl-iso-pentylammonium bromide as a main agent for the heat transport medium may be set lower to use the solution as the heat transport medium at the same temperature and accordingly, the material cost of the heat transport medium may be possibly saved. Further, the concentration of the material for producing the hydrate is lowered and accordingly it can be expected that the hydration number of the hydrate to be produced can be increased and the latent heat quantity can be increased.

As described, the hydrate slurry prepared by cooling the aqueous solution with a concentration lower than the congruent concentration of the tri-n-butylalkylammonium salt is preferable as the heat transport medium. Further, even aqueous solutions with the congruent concentration or a concentration higher than the congruent concentration can be converted into slurry state by adjusting the ratio (solid phase ratio) of hydrate particles in the aqueous solutions by adjusting the cold quantity to give, and these solutions may be also used as a heat transport medium.

(6) High Temperature Heat Storage Agent

In the above embodiment, although tri-n-butyl-n-pentylammonium bromide or tri-n-butyl-n-pentylammonium chloride is exemplified among tri-n-butylalkylammonium salts as a heat storage agent or a heat transport medium for storing cold and heat (in particular, heat at lower than 20° C.), those tri-n-butylalkylammonium salts which have a hydrate melting point of 20° C. or higher (preferably 20 to 30° C.) are usable as a heat storage agent or a heat transport medium for storing heat suitable for a greenhouse or floor panel heating.

Examples of such a high temperature heat storage agent may be tri-n-butyl-isopentylammonium fluoride and tri-n-butyl-n-pentylammonium fluoride.

Further, it is possible to use a heat storage agent not only in a cold range or a heat range alone but also in both cold and heat ranges by properly setting a hydrate melting point. That is, a single medium may be used for both summer and winter seasons.

Next, as a tri-n-butylalkylammonium salt hydrate, tri-n-butyl-n-pentylammonium bromide hydrate is exemplified and an embodiment of using a heat storage agent or a heat transport medium of the present invention containing it as a main agent will be described in the following Examples.

It is needless to say that other tri-n-butylalkylammonium salts such as tri-n-butyl-n-pentylammonium chloride and their hydrates can be used as a heat storage agent or a heat transport medium in the same application.

Example 1

Example 1 relates to an air conditioning facility using tri-n-butyl-n-pentylammonium bromide hydrate as a heat transport medium.

Figure 2:
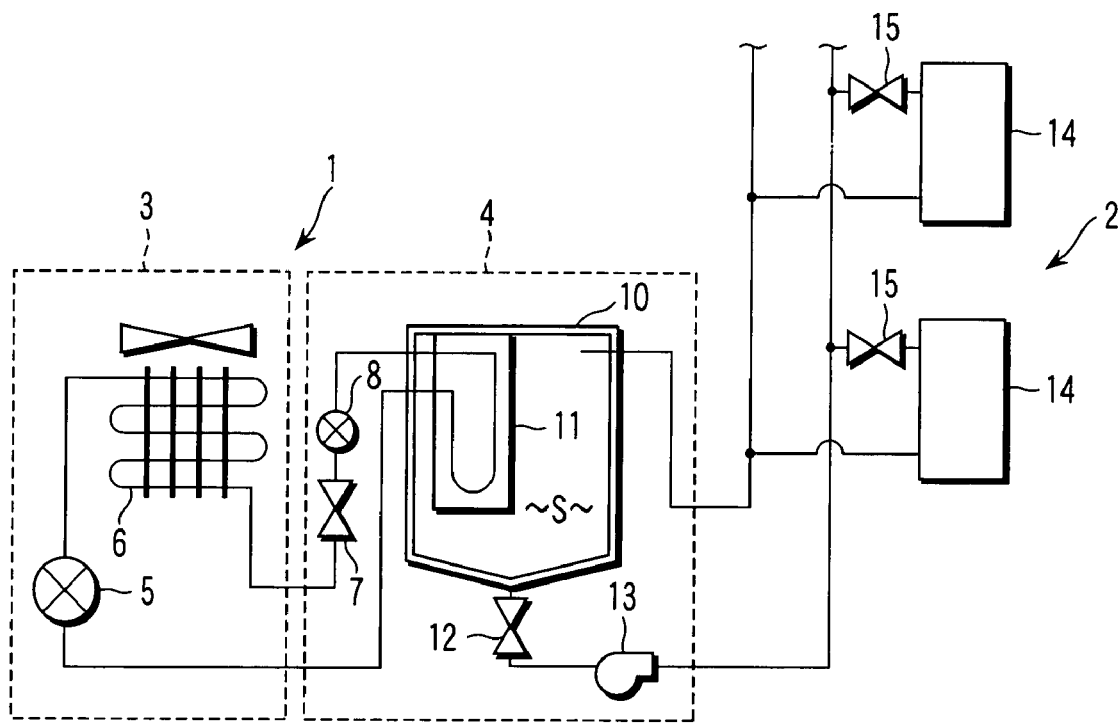
FIG. 2 is an illustration of an air conditioning facility according to Example 1.

FIG. 2 is an illustration of an air conditioning facility of this Example. The air conditioning facility shown in FIG. 2 includes an outdoor unit 1 and load-side equipment 2, and this load-side equipment 2 is provided with a plurality of indoor units 14. Further, the above-mentioned outdoor unit 1 includes a refrigerating apparatus 3 and a heat storage apparatus 4.

The above-mentioned refrigerating apparatus 3 is provided with a compressor 5 to compress a refrigerant such as chlorofluorocarbon and a condenser 6 to condense the refrigerant by cooling. The condensed refrigerant is circulated through a control valve 7 and an expansion valve 8 and evaporated to produce cold. The evaporated and expanded refrigerant is again compressed by the above-mentioned compressor 5.

Further, in the above-mentioned heat storage apparatus 4, an integrated type heat storage tank 10 is provided and the heat storage tank 10 has a heat insulation structure. The heat storage tank 10 is filled with an aqueous solution S of tri-n-butyl-n-pentylammonium bromide of the present invention. Further, a heat exchanger 11 is disposed in the heat storage tank 10 and the refrigerant is supplied from the above-mentioned refrigerating apparatus 3 to cool the aqueous solution inside of the heat storage tank 10 and produce hydrate particles.

The hydrate slurry in which the hydrate particles and the aqueous solution are mixed is stored in the heat storage tank 10, stores cold, and is sent to the respective indoor units 14 by a pump 13 through a control valve 12 to supply cold by heat exchange with air. The hydrate slurry or the aqueous solution heat-exchanged with air is returned to the heat storage tank 10. The reference numeral 15 denotes a flow regulating valve of the respective indoor units 14.

In this Example, the compressor 5 is operated by using midnight power to produce the hydrate slurry in midnight and the produced hydrate slurry is stored in the heat storage tank 10. At the time of operating the air conditioning facility in daytime, the hydrate slurry stored in the heat storage tank 10 is supplied to the indoor units 14 to carry out air conditioning and accordingly, the midnight power is efficiently utilized.

Example 2

Example 2 relates to an air conditioning facility using tri-n-butyl-n-pentylammonium bromide hydrate as a heat storage agent.

Figure 3:
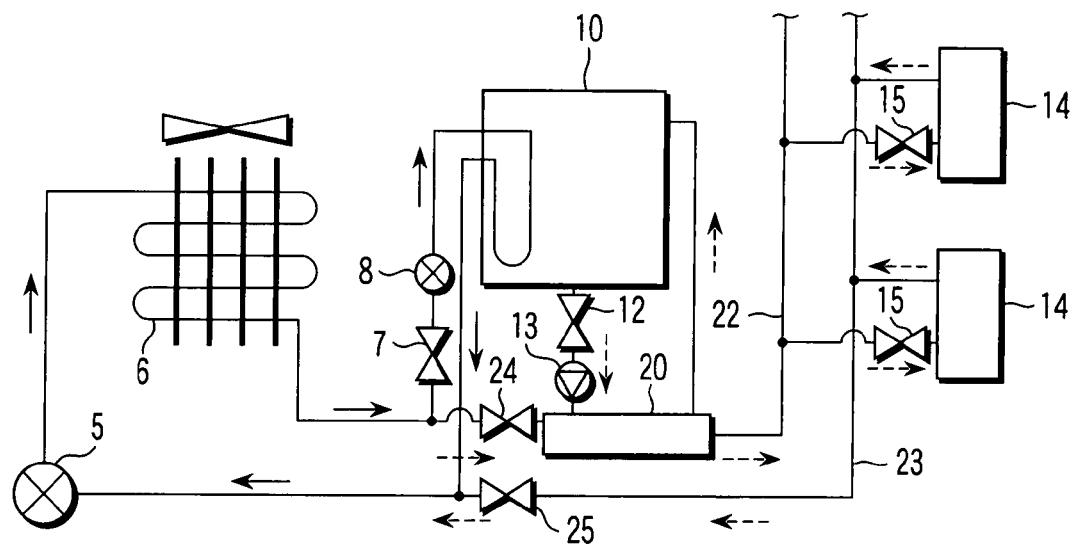
FIG. 3 is an illustration of an air conditioning facility according to Example 2.

FIG. 3 is an illustration of an air conditioning facility of this Example. The same symbols are assigned to the same components as those in FIG. 2. The air conditioning facility of this Example is enabled to operate the refrigerating apparatus and simultaneously supply the stored hydrate slurry to the load side after heat exchange with a refrigerant such as chlorofluorocarbon and use the hydrate slurry stored in the heat storage tank 10 as a cold source.

That is, as shown in FIG. 3, the air conditioning facility of this Example is provided with a refrigerant heat exchanger 20 for heat exchanging the hydrate slurry with a refrigerant such as chlorofluorocarbon, and the refrigerant heat exchanger 20 and the above-mentioned heat load side indoor units 14 are connected with an outgoing pipe 22 and a return pipe 23 to circulate the refrigerant such as chlorofluorocarbon therein. The hydrate slurry stored in the heat storage tank 10 is supplied to the refrigerant heat exchanger 20 through the control valve 12 by the pump 13 to heat-exchange with the refrigerant to cool or condense the refrigerant. The refrigerant flowing in the refrigerant heat exchanger 20 is circulated to the refrigerating apparatus via valves 24 and 25.

An arrow drawn with the solid line in the drawing shows the circulation path of the refrigerant at the time of heat storage operation in night time and an arrow drawn with the dotted line shows the circulation path of the refrigerant and the hydrate slurry at the time of load operation in daytime.

In this Example, the refrigerating apparatus is operated in the case of load operation in daytime, and the gaseous or partially liquid refrigerant passed through the condenser 6 is supplied to the above-mentioned refrigerant heat exchanger 20 to carry out heat exchange with the hydrate slurry in the heat storage tank 10 to cool or condense the refrigerant, and the refrigerant is sent to the indoor units 14 in the heat load side. The refrigerant returned from the indoor units 14 is again compressed by the compressor 5 and sent to the condenser 6.

In this Example, the heat medium to be sent to the indoor units 14 is a refrigerant such as chlorofluorocarbon, and the indoor units 14 using such a conventional refrigerant may be used as they are. In the facility in this Example, the hydrate slurry in the heat storage tank 10 and the refrigerating apparatus as cold sources are co-operated and the facility can flexibly deal with alteration of the load.

Example 3

Example 3 relates to an air conditioning facility using tri-n-butyl-n-pentylammonium bromide hydrate as a heat storage agent, same as Example 2.

Figure 4:
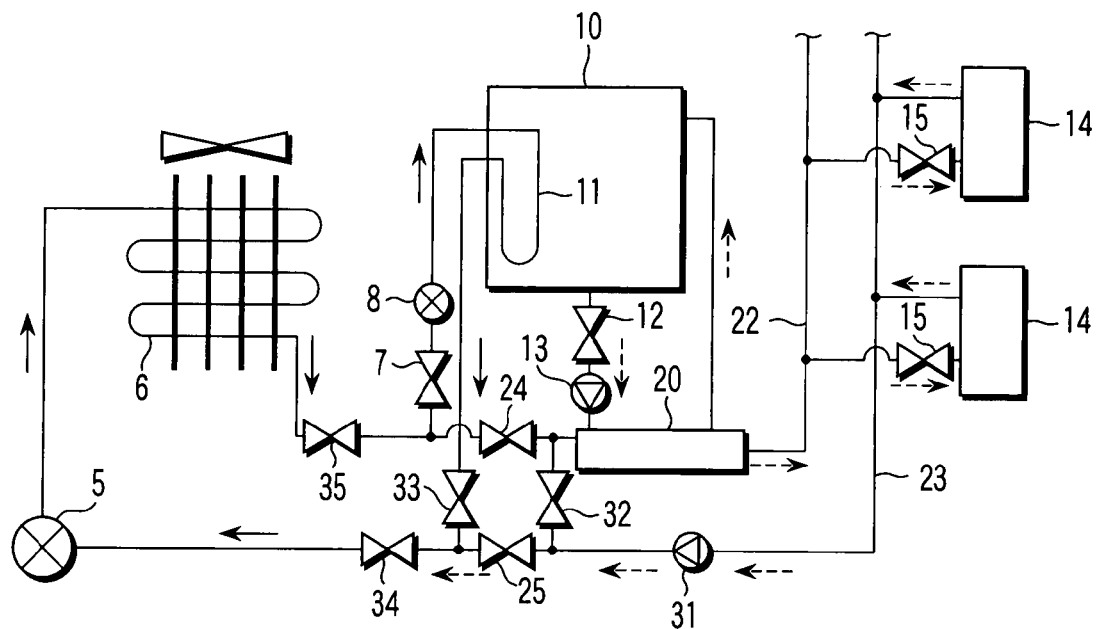
FIG. 4 is an illustration of an air conditioning facility according to Example 3.

FIG. 4 is an illustration of an air conditioning facility of this Example. The same symbols are assigned to the same components as those in FIG. 2. The air conditioning facility of this Example is enabled to carry out at least one of operation using only the hydrate slurry as a cold source by heat-exchanging cold of the hydrate slurry stored in the heat storage tank 10 with the refrigerant such as chlorofluorocarbon and accordingly supplying cold to the load side and operation using the refrigerating apparatus as a cold source.

That is, the air conditioning facility of this Example shown in FIG. 4 has a refrigerant heat exchanger 20, a first heat exchanger for heat exchanging the hydrate slurry in the heat storage tank 10 with a refrigerant such as chlorofluorocarbon, and the refrigerant heat exchanger 20 and the indoor units 14 in the heat load side are connected with a outgoing pipe 22 as a first outgoing pipe, and a return pipe 23 as a first return pipe, for circulating the refrigerant such as chlorofluorocarbon. The hydrate slurry in the heat storage tank 10 is supplied to the refrigerant heat exchanger 20 through the valve 12 by the pump 13 and heat-exchanged with the refrigerant to cool or condense the refrigerant.

The refrigerant flowing in the refrigerant heat exchanger 20 is enabled to flow in refrigerating apparatuses 5 and 6 via valves 24 and 25. Further, an aqueous solution with a concentration lower than the congruent concentration at which tri-n-butyl-n-pentylammonium bromide forms a hydrate is stored in the heat storage tank 10. Further, in the heat storage tank 10, a heat exchanger 11 as a second heat exchanger is provided and the refrigerant from the refrigerating apparatuses 5 and 6 is supplied via a second outgoing pipe to cool the aqueous solution in the heat storage tank 10 and produce hydrate particles and accordingly produce hydrate slurry. Further, the refrigerant is circulated to the compression type refrigerating apparatuses 5 and 6 from the heat exchanger 11 as the second heat exchanger through a second return pipe.

An arrow drawn with the solid line in the drawing shows the circulation path of the refrigerant at the time of heat storage operation in night time and an arrow drawn with the dotted line shows the circulation path of the refrigerant and the hydrate slurry at the time of load operation in daytime.

The facility of this Example is enabled to carry out heat exchange between the refrigerant and the hydrate slurry by installing a refrigerant gas pump 31 in the middle of the return pipe 23 for the refrigerant serving as the first return pipe and switching valves 32, 33, 34, and 35, and circulating the refrigerant between the indoor units 14 and the refrigerant heat exchanger 20, which is the first heat exchanger, without passing the refrigerant to the condenser 5 of the refrigerating apparatus.

Further, the facility of this Example uses a heat medium to be sent to the indoor units 14 as the refrigerant such as chlorofluorocarbon just like the above-mentioned facility of Example 2 and can therefore employ existing indoor units 14 using a conventional refrigerant as they are.

Further, in the facility of this Example, operation using only the hydrate slurry in the heat storage tank 10 as a cold source, operation only by the refrigerating apparatus, and parallel operation using both of the hydrate slurry in the heat storage tank 10 and the refrigerating apparatus as cold sources may be selected by operating the switching valves 32, 33, 34, and 35 and thus flexible operation can be carried out in accordance with the situation.

The embodiments of the air conditioning facilities are not limited to those shown in FIGS. 2 to 4, for example models of the refrigerating apparatuses are not limited to the above exemplified ones, and various types may be employed.

Example 4

This Example relates to a clathrate hydrate slurry production apparatus for producing clathrate hydrate slurry from an aqueous solution of tri-n-butyl-n-pentylammonium bromide.

Figure 5:
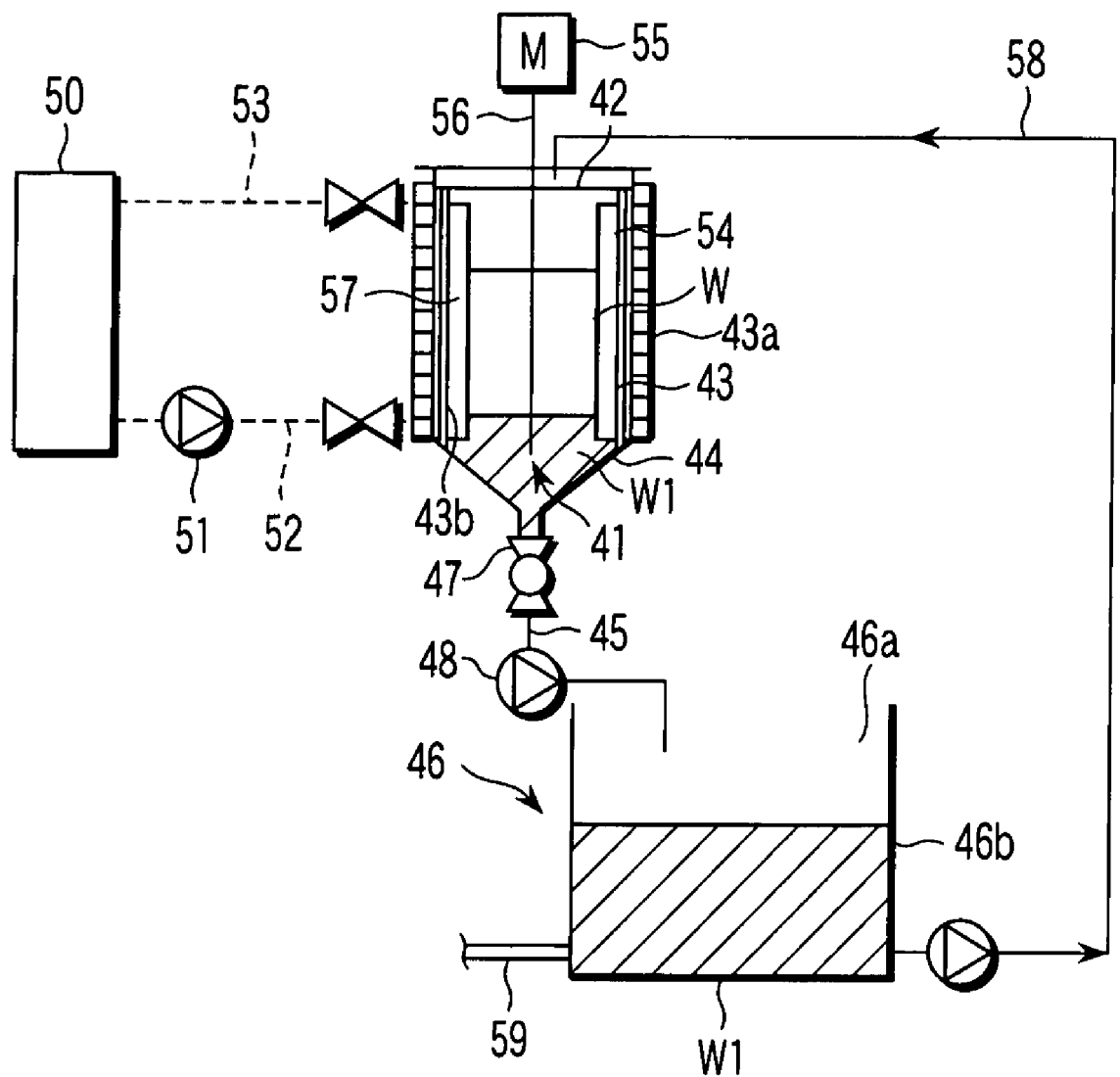
FIG. 5 is an illustration of an apparatus for producing clathrate hydrate slurry according to Example 4.

FIG. 5 is an illustration of a clathrate hydrate slurry production apparatus of this Example. As shown in FIG. 5, a hydrate production evaporator (hereinafter, referred to as a cylindrical heat exchanger 41) for producing a clathrate hydrate slurry is provided to the clathrate hydrate slurry production apparatus. The cylindrical heat exchanger 41 includes an air-open type cylindrical container 43 having an opening 42 in the top part and a funnel part 44 is formed integrally in the lower part. Further, a jacket 43a is formed in the outer circumferential face of the cylindrical container 43 of the cylindrical heat exchanger 41 and the inner circumferential face of the cylindrical container 43 is formed to be a cooling face 43b.

The above-mentioned funnel part 44 is connected to a heat storage tank 46 through a pipe 45, and a solenoid valve 47 and a pump 48 are provided to the middle of the pipe 45. The heat storage tank 46 includes an air-open type container 46b having an opening 46a in the top part.

An aqueous solution W of tri-n-butyl-n-pentylammonium bromide for producing a clathrate hydrate upon cooling is stored inside of the above-mentioned cylindrical heat exchanger 41.

A refrigerating apparatus 50 is arranged outside of the cylindrical heat exchanger 41 and provided with a refrigerant pipe 52 for supply equipped with a brine pump 51 for supplying brine, as a cooling fluid cooled to a temperature equal to or lower than the clathrate hydrate production temperature, to the inside of the cylindrical heat exchanger 41, and the refrigerant pipe 52 is connected with the jacket 43a of the cylindrical heat exchanger 41. Further, a refrigerant return pipe 53 is connected to the cylindrical heat exchanger 41 to circulate the brine to the refrigerating apparatus 50.

The aqueous solution W inside the above-mentioned cylindrical heat exchanger 41 is cooled with the brine to produce the clathrate hydrate and the produced clathrate hydrate adheres to the cooling face 43b.

A stirring mechanism 54 for stirring the clathrate hydrate and the aqueous solution W while scraping the clathrate hydrate adhering to the cooling face 43b, is provided to the cylindrical heat exchanger 41. The stirring mechanism 54 includes an electric motor 55 mounted on the top part of the cylindrical heat exchanger 41, a rotary shaft 56 inserted into the center of the cylindrical heat exchanger 41 and rotated by the electric motor 55, and rotating stirring blades 57 attached to the rotary shaft 56 and sliding along the cooling face 43b.

The rotating stirring blades 57 are made of an elastic body of a rubber sheet, a soft synthetic resin sheet, or the like and enabled to slide along the cooling face 43b of the cylindrical heat exchanger 41. Since the rotating stirring blades 57 are made of the elastic body, even if the precision of the circularity of the cylindrical heat exchanger 41 is low, the blades can reliably slide along the cooling face 43b and carry out scraping and at the same time the scraping noise can be lowered.

The heat storage tank 46 is provided with a return pipe 58 for returning the clathrate hydrate slurry W1 to the cylindrical heat exchanger 41 and a supply pipe 59 for sending the clathrate hydrate slurry W1 to the heat load side (not shown) of an air conditioning facility, and is used as a cold source.

Next, the function of the clathrate hydrate slurry production apparatus having the above-mentioned configuration will be described. When the aqueous solution W is stored in the cylindrical container 43 of the cylindrical heat exchanger 41 and the refrigerating apparatus 50 is operated, brine is led to the cylindrical heat exchanger 41 by the brine pump 51 and the aqueous solution W in the cylindrical heat exchanger 41 is cooled to produce the clathrate hydrate, which adheres to the cooling face 43b.

At this time, the rotary shaft 56 is rotated by operation of the electric motor 55 and the rotating stirring blades 57 are rotated and slide along the cooling face 43b to scrape the clathrate hydrate adhering to the cooling face 43b. Since the clathrate hydrate is scraped, the clathrate hydrate is dispersed in the solution to form creamy clathrate hydrate slurry W1, and since the clathrate hydrate slurry W1 is stirred by the rotating stirring blades 57, the slurry maintains fluidity.

Further, when the solenoid valve 47 is opened and the pump 48 is operated, the clathrate hydrate slurry W1 accumulated in the bottom part of the cylindrical container 43 is sent to the heat storage tank 46 via the pipe 45 and subjected to heat storage in the heat storage tank 46. The clathrate hydrate slurry W1 subjected to heat storage in the heat storage tank 46 is sent to a heat load side of an air conditioning facility or the like via the supply pipe 59 and used as a cold source.

Example 5

Figure 6:
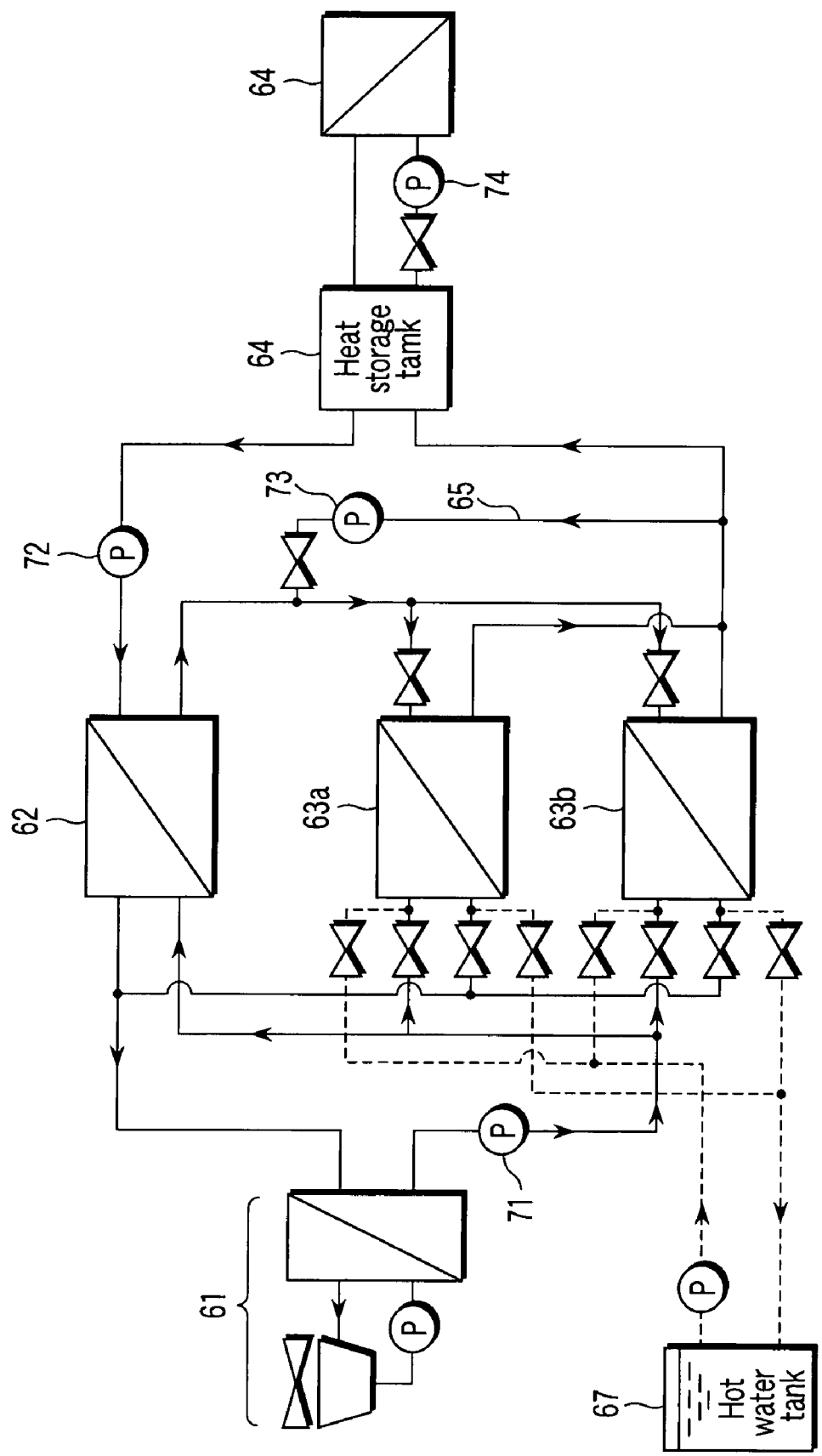
FIG. 6 is an illustration of an air conditioning system in which the apparatus for producing clathrate hydrate slurry according to Example 5 is assembled.

Example 5 relates to an air conditioning system in which a production apparatus of tri-n-butyl-n-pentylammonium bromide hydrate slurry is incorporated. FIG. 6 is an illustration of an air conditioning system of this Example in which a hydrate slurry production apparatus is incorporated. At first, the major members in the air conditioning system will be briefly described.

A refrigerating apparatus 61 including a cooling tower, a pump, and a heat exchanger produces cold water as cooling medium for cooling an aqueous solution of tri-n-butyl-n-pentylammonium bromide and hydrate slurry. As a heat exchanger for producing the hydrate slurry, two stages of heat exchangers are provided. The sensible heat exchanger (a first heat exchanger) 62 cools the aqueous solution by heat exchange with cold water. Two latent heat exchangers (second heat exchangers) 63a and 63b provided downstream of the sensible heat exchanger 62 cool the hydrate slurry by heat exchange with the cold water.

In the example shown in FIG. 6, the cold water produced by the refrigerating apparatus 61 is supplied to the sensible heat exchanger 62 and latent heat exchangers 63a and 63b in parallel, but instead it may be supplied in series. The number of the latent heat exchangers may be increased to three or more correspondingly to the air conditioning load. An aqueous solution of tri-n-butyl-n-pentylammonium bromide, which is a guest compound, is sent to the sensible heat exchanger 62 from the heat storage tank 64 and cooled to the supercooling state, and the aqueous solution is released from the supercooling downstream of the sensible heat exchanger 62 to produce a hydrate slurry, which is further cooled by the latent heat exchanger 63a or 63b and returned to the heat storage tank 64.

In this system, an injection pipe 65 is connected between the sensible heat exchanger 62 and the latent heat exchangers 63a and 63b from a pipe downstream of the latent heat exchangers 63a and 63b to inject part of the hydrate slurry to the aqueous solution in the supercooling state, thereby releasing the aqueous solution from the supercooling. The hydrate slurry is sent to an air conditioning load 66 from the heat storage tank 64 and supplies cold to the air conditioning load 66, and the aqueous solution obtained by phase conversion of the hydrate slurry is returned to the heat storage tank 64. Hot water is sent to the latent heat exchanger 63a or 63b, which is needed to melt the hydrate slurry, from a hot water tank 67.

In FIG. 6, although cold water produced by the refrigerating apparatus 61 is used as a cooling medium to cool the aqueous solution and the hydrate slurry, cold water taken out of the ice heat storage tank may be used as a cooling medium. Further, although the heat storage tank 64 is provided in FIG. 6, it is not necessarily required to provide the heat storage tank and the hydrate slurry produced by the latent heat exchangers may be directly sent to the air conditioning load.

Hereinafter, the operation of the air conditioning system according to this Example will be described more in detail.

There is no hydrate slurry at the time of starting the system and only an aqueous solution containing a guest compound (tri-n-butyl-n-pentylammonium bromide) is contained in the heat storage tank 64. The concentration of the guest compound in the aqueous solution is set in accordance with the air conditioning load of the air conditioning system. The heat density of the hydrate slurry or cold water temperature may be changed to be suitable for the air conditioning load of the air conditioning system by changing the concentration.

Before starting the air conditioning operation, the hydrate slurry is prepared. At first, the aqueous solution in the heat storage tank 64 is led to the sensible heat exchanger 62 and one of the latent heat exchangers 63a by a production pump 72 and circulated to the heat storage tank 64. The other latent heat exchanger 63b is not used.

Next, the refrigerating apparatus 61 is operated and the cold water produced by the heat exchanger of the refrigerating apparatus 61 is led to the sensible heat exchanger 62 and the latent heat exchanger 63a by a cold water pump 71 and circulated to the heat exchanger of the refrigerating apparatus 61. At this time, the cooling degree of the aqueous solution by the sensible heat exchanger 62 is adjusted to be proper for spontaneously releasing the supercooling and a small amount of hydrate slurry is produced. Further, while the hydrate slurry is cooled by the latent heat exchanger 63a, hydrate slurry in an amount proper to operate air conditioning is produced. In such a manner, after the aqueous solution is at first led to the hydrate slurry production apparatus, cold water is led thereto as a cooling medium, so that clogging of the latent heat exchanger can be prevented.

Next, the aqueous solution is super-cooled by the sensible heat exchanger 62. The aqueous solution in the supercooling state flowing in the pipe between the sensible heat exchanger 62 and the latent heat exchanger 63a is mixed with the hydrate slurry from the pipe downstream of the latent heat exchanger 63a through the injection pipe 65 by operating the injection pump 73. The hydrate in the injected hydrate slurry becomes a nucleus for hydrate production in the aqueous solution.

In such a manner, the supercooling state of the aqueous solution super-cooled by the sensible heat exchanger 62 is released to produce hydrate slurry with a low solid-phase ratio. After that, the hydrate slurry is further cooled by the latent heat exchanger 63a. Since the hydrate slurry is sent to the latent heat exchanger 63a, the slurry is already released from the supercooling. At this time, the hydrate slurry with a desired heat density corresponding to the air conditioning load 66 is produced by regulating the flow rate of the cold water led to the latent heat exchanger 63a. As described, operation may be shifted to highly efficient hydrate slurry production operation and the air conditioning operation can be started.

In air conditioning operation, the aqueous solution returned to the heat storage tank 64 from the air conditioning load 66 is sent to the sensible heat exchanger 62 by the production pump 72 to be super-cooled, and released from the supercooling state by injecting the hydrate slurry from the injection pipe 65 to become the hydrate slurry, which is further cooled by the latent heat exchanger 63a, returned to the heat storage tank 64, and is sent from the heat storage tank 64 to the air conditioning load 66 by a load pump 74. In this case, if the heat density of the hydrate slurry is controlled in such a manner that the total power of the transport power to the heat exchangers and the transport power to the load can be lowered to the minimum, the operation can be carried out with saved energy.

During the air conditioning operation, if it is determined that the hydrate slurry starts adhering to the heat transmission face of the latent heat exchanger 63a, the hydrate slurry production by the latent heat exchanger 63a is stopped to prevent clogging and operation is switched to the latent heat exchanger 63b to continue the hydrate slurry production.

Thereafter, the latent heat exchanger 63a is switched to melting operation. The adhesion of the hydrate slurry to the heat transmission face of the latent heat exchanger can be determined on the basis of the detection of the flow rate decrease of the hydrate slurry flowing into the latent heat exchanger by monitoring the flow rate of the hydrate slurry with a flow meter (not shown) provided to an upstream pipe of each latent heat exchanger. Similarly, the adhesion of the hydrate slurry to the heat transmission face of the latent heat exchanger can be determined on the basis of the increase of pressure loss or the decrease of the heat exchange quantity by measuring the difference between the inlet temperature and the outlet temperature of the cold water or the hydrate slurry to be supplied to the latent heat exchanger.

The operation in melting operation will be described. Cold water supply to one latent heat exchanger 63a is stopped, and cold water supply to the other latent heat exchanger 63b is started. The hydrate slurry can be continuously produced by switching from the latent heat exchanger 63a to the latent heat exchanger 63b in such a manner. Hot water is supplied from the hot water tank 67 to the latent heat exchanger 63a to which the cold water supply is stopped, to melt the hydrate adhering to the heat transmission face of the inside of the heat exchanger. Incidentally, although hot water for melting which is heated by the heater in the hot water tank 67 is employed in FIG. 6, cold water which is heated by heat exchange and discharged out of the latent heat exchangers or the sensible heat exchanger may be used for melting operation.

In the above description, the melting operation is to be carried out in the case that the flow rate of the hydrate slurry to the latent heat exchanger is decreased, in the case the pressure loss is increased, or in the case the heat exchange quantity is decreased. On the other hand, if the melting operation is carried out by successively changing a plurality of latent heat exchangers at every prescribed period, the number of detectors such as a flow meter, a pressure gauge, and a thermometer can be reduced and the system can be simplified.

As described above, if the heat exchangers of the hydrate slurry production apparatus are separated to a sensible heat exchanger for super-cooling the aqueous solution while keeping the aqueous solution in the solution state and latent heat exchangers for cooling the hydrate slurry, and a plurality of latent heat exchangers are provided in a switchable manner, clogging of the latent heat exchangers can be reliably prevented and the hydrate slurry can be continuously and highly efficiently produced.

Example 6

Example 6 relates to a heat storage unit for enhancing the cooling capability of an existing heat pump type air conditioning facility.

Figure 7:
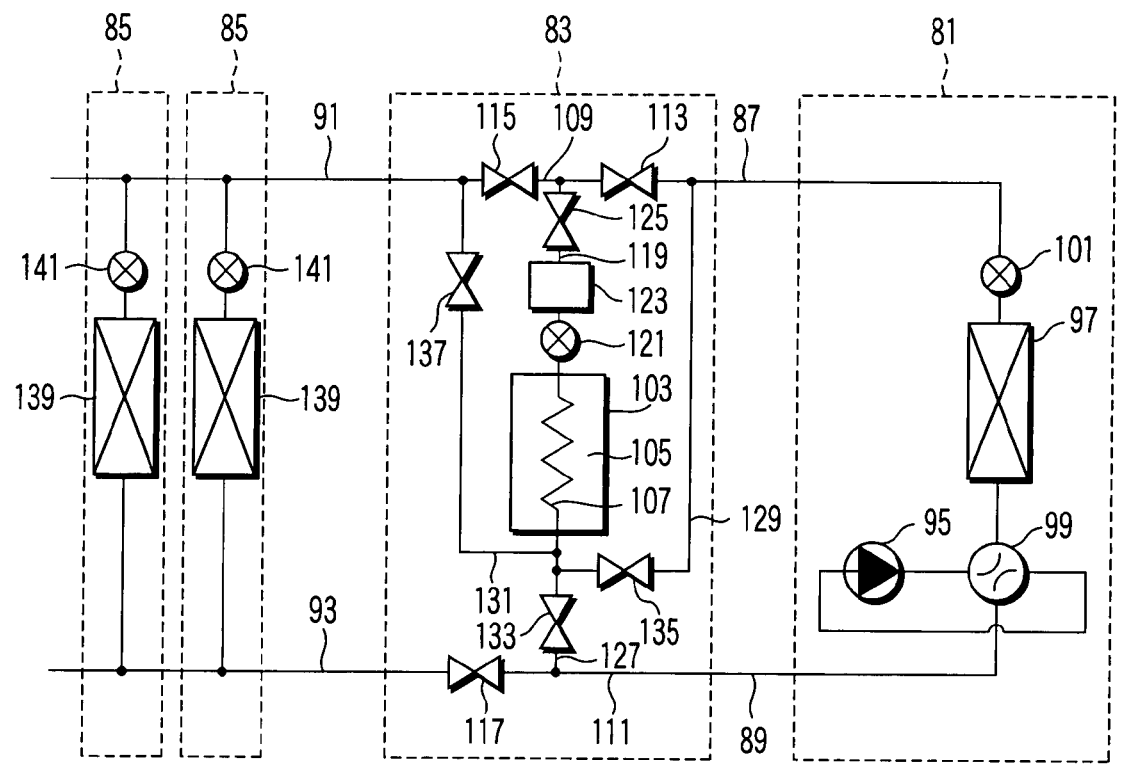
FIG. 7 is an illustration of an existing heat pump type air conditioning apparatus in which a heat storage unit according to Example 6 is provided.

FIG. 7 is an illustration of a heat pump type air conditioning apparatus in which a heat storage unit of this Example is provided. The heat pump type air conditioning apparatus is configured by newly incorporating a heat storage unit apparatus 83 in an existing heat pump type air conditioning apparatus, which includes an outdoor equipment 81 and indoor equipments 85 connected with two refrigerant pipes, and includes the outdoor equipment 81, the heat storage unit apparatus 83, and a plurality of indoor equipments 85.

The outdoor equipment 81 and the heat storage unit apparatus 83 are connected with two refrigerant pipes 87 and 89, and the heat storage unit apparatus 83 and the indoor equipments 85 are similarly connected with two refrigerant pipes 91 and 93. In the existing heat pump type air conditioning apparatus, the refrigerant pipe 87 and the refrigerant pipe 91 are liquid refrigerant pipes in which a liquid refrigerant mainly flows and the refrigerant pipe 89 and the refrigerant pipe 93 are gas refrigerant pipes in which a gas refrigerant mainly flows.

The outdoor equipment 81 is provided with a compressor 95 for increasing the pressure of the gas refrigerant to a prescribed pressure, an outdoor heat exchanger 97 for carrying out heat exchange between the refrigerant and outside air, a four-way valve 99 for switching the flow of the refrigerant in accordance with operation modes, and an expansion valve 101. The four connection ports of the four-way valve 99 are connected to the discharge side and suction side of the compressor 95, one end of the outdoor heat exchanger 97, and the refrigerant pipe 89 through pipes. The opposed side, to the side of the outdoor heat exchanger 97 where the four-way valve 99 is connected, is connected with the refrigerant pipe 87 through the expansion valve 101.

The heat storage unit apparatus 83 is provided with a heat storage tank 103 for storing a heat storage agent 105 and a heat exchanger 107 for heat storage for carrying out heat exchange between the heat storage agent 105 in the heat storage tank and the refrigerant.

The heat storage agent 105 to be used is an aqueous solution of tri-n-butyl-n-pentylammonium bromide of the present invention. The congruent melting point Tm of tri-n-butyl-n-pentylammonium bromide is 9° C., which is a melting point higher than the evaporation temperature Te of the refrigerant and is lower than the condensation temperature Tc. The evaporation temperature Te and the condensation temperature Tc mean the designed evaporation temperature and the designed condensation temperature of the existing heat pump type air conditioning apparatus.

Since the melting point Tm is in the above-mentioned range, while the highly efficient operation state of the existing heat pump type air conditioning apparatus is kept under the operation conditions of the evaporation temperature and the condensation temperature as it is, it is possible to store large quantities of cold and heat by utilizing the freezing and melting latent heat in phase change from a liquid to a solid of the heat storage agent.

As described, since tri-n-butyl-n-pentylammonium bromide has a congruent melting point Tm within the above-mentioned range, the cooling and heating capability can be enhanced by providing the heat storage unit apparatus 83 to the existing heat pump type air conditioning apparatus.

The configuration of the apparatus will be explained referring to FIG. 7 again.

The apparatus of this Example is provided with a pipe 109 (equivalent to the first pipe of the present invention) connected to the refrigerant pipe 87 in one end and to the refrigerant pipe 91 in the other end, and a pipe 111 (equivalent to the second pipe of the present invention) connected to the refrigerant pipe 89 in one end and to the refrigerant pipe 93 in the other end. In the pipe 109, an on-off valve 113 (equivalent to the first on-off valve of the present invention) and an on-off valve 115 (equivalent to the second on-off valve of the present invention) are provided in this order nearer to the refrigerant pipe 87. In the pipe 111, an on-off valve 117 (equivalent to the third on-off valve of the present invention) is also provided.

One end of the heat exchanger for heat storage 107 is connected to a point between the on-off valves 113 and 115 in the pipe 109 through the pipe 119. In the pipe 119, an expansion valve 121, an accumulator 123, and an on-off valve 125 (equivalent to the fourth on-off valve of the present invention) are provided in this order nearer to the heat exchanger for heat storage 107.

The other end of the heat exchanger for heat storage 107 is connected to the pipes 111 and 109 through three pipes 127, 129 and 131. That is, the other end is connected at a position nearer to the refrigerant pipe 89 than the on-off valve 117 in the pipe 111 through the pipe 127; at a position nearer to the refrigerant pipe 87 than the on-off valve 113 in the pipe 109 through the pipe 129; and at a position nearer to the refrigerant pipe 91 than the on-off valve 115 in the pipe 109 through the pipe 131. An on-off valve 133 (equivalent to the fifth on-off valve of the present invention) is provided to the pipe 127; an on-off valve 135 (equivalent to the seventh on-off valve of the present invention) in the pipe 129; and an on-off valve 137 (equivalent to the sixth on-off valve of the present invention) in the pipe 131.

An indoor heat exchanger 139 for carrying out heat exchange between indoor air and the refrigerant is provided to the indoor equipment 85. One end of the indoor heat exchanger 139 is connected to the refrigerant pipe 91 and the other end is connected to the refrigerant pipe 93 respectively through pipes. An expansion valve 141 is provided to the path connecting the indoor heat exchanger 139 and the refrigerant pipe 91.

FIG. 7 shows typical configurations of the outdoor equipment 81 and the indoor equipment 85, showing only major members and, if necessary, an accumulator and a control vale may be connected or a plurality of groups of the members may be provided. That is, as long as the heat pump type air conditioning apparatus includes outdoor equipment and indoor equipment connected with two refrigerant pipes, the configurations of the outdoor equipment and the indoor equipment may be arbitrary.

The heat pump type air conditioning apparatus with the above-mentioned configuration can be operated in the following respective operation modes: normal cooling operation for cooling without functioning the heat storage unit apparatus 83; cold storage operation for storing cold in the heat storage agent 105 in the heat storage tank 103; cooling operation for cooling using cold stored in the heat storage agent 105; normal heating operation for heating without functioning the heat storage unit apparatus 83; heat storage operation for storing heat in the heat storage agent 105 in the heat storage tank 103; and heating operation for heating using the heat stored in the heat storage agent 105.

In the above Example 6, the heat pump type air conditioning apparatus in which the heat storage unit apparatus for enhancing the cooling capability of the existing heat pump type air conditioning apparatus has been explained, and it is of course possible to use a newly provided heat pump type air conditioning apparatus with the same configuration.

Example 7

Example 7 relates to a heat storage apparatus for storing heat by immersing a heat storage body in a refrigerant liquid such as water.

Figure 8:
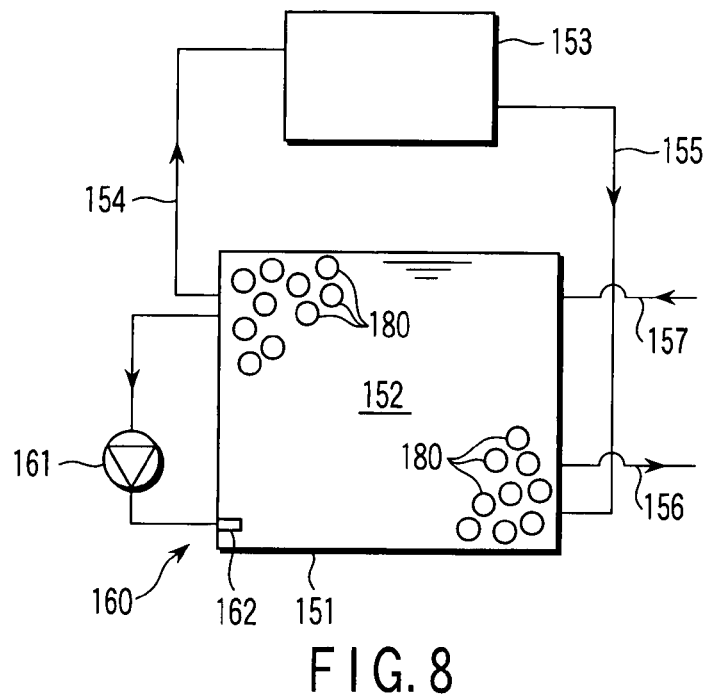
FIG. 8 is an illustration of a heat storage apparatus according to Example 7.

FIG. 8 is an illustration of a heat storage apparatus of this Example. The apparatus is provided with a storage tank 151, in which and a refrigerant liquid such as water 152 is stored. The reference numeral 153 denotes a refrigerating apparatus, and water 152 inside of the storage tank 151 is circulated between the refrigerating apparatus 153 and the tank through pipes 154 and 155 and cooled to store cold.

The water 152 inside of the storage tank 151 is circulated between a cold load (not shown) such as an air conditioning facility and the tank through pipes 156 and 157 to use the stored cold. A large number of heat storage bodies 180 enclosing an aqueous tri-n-butyl-n-pentylammonium bromide solution are immersed in the water 152 inside of the storage tank 151 in floating state to increase the heat storage quantity of the water 152 inside of the heat storage tank 151. These heat storage bodies 180 will be described later.

In the above-mentioned storage tank 151, a circulation mechanism 160 as container driving means for changing the posture of the heat storage bodies 180 or moving them is provided. The circulation mechanism 160 includes a pump 161 and a nozzle 162 for circulating the water 152 inside of the storage tank 151 to fluidize or stir the water.

Next, the configuration of the above-mentioned heat storage bodies 180 will be described. Each heat storage body 180 has a spherical container having tightly closing property and the container encloses therein an aqueous tri-n-butyl-n-pentylammonium bromide solution.

The container also encloses a prescribed amount of air or another gas to form a hollow space part, and accordingly the apparent specific gravity of the entire heat storage body 180 is made equal to that of the ambient refrigerant liquid or water to float the heat storage body 180 freely in water.

The above-mentioned hollow space part can compensate for the volume alteration caused by the expansion or contraction of the aqueous solution in the container of the heat storage body 180 and production of hydrate by expansion and contraction of the space.

Next, the operation of the above-mentioned apparatus will be described. The above refrigerating apparatus 153 is operated by using midnight power to store produced cold in the water 152 in the storage tank 151.

In this case, when the water 152 in the storage tank 151 is cooled, the aqueous tri-n-butyl-n-pentylammonium bromide solution is cooled through the wall of the container of the heat storage body 180 to produce hydrate particles and a hydrate slurry. When water of the storage tank 151 is used as a cold source, on the contrary, the hydrate slurry in the heat storage body 180 is melted. In such a manner, the heat storage quantity can be increased due to the latent heat of the hydrate.

Further, since the above-mentioned hydrate slurry has fluidity, it has high heat exchange efficiency with ambient water.

Example 8

Example 8 relates to a cold storage type refrigerator containing a cold storage material in a storage chamber. The cold storage type refrigerator of this Example has a cold reservoir prepared by filling an aqueous tri-n-butyl-n-pentylammonium bromide solution in a container, which is fixed in a lower part of a tray housed in the storage chamber. Such a configuration can store cold using tri-n-butyl-n-pentylammonium bromide hydrate having a high latent heat quantity, so that the electric power consumption can be saved.

Example 9

Example 9 relates to a cold storage automatic vending machine for canned beverage using tri-n-butyl-n-pentylammonium bromide as a heat storage agent.

Similarly to the case of the above-mentioned refrigerator, the cold storage automatic vending machine of this Example has a cold reservoir prepared by filling an aqueous tri-n-butyl-n-pentylammonium bromide solution in a container, which is provided to the inner wall of a product storage chamber. An evaporator is arranged between the container and the inner wall.

Such a configuration can store cold using tri-n-butyl-n-pentylammonium bromide hydrate having a high latent heat quantity, so that the electric power consumption required for refrigerating products can be saved.

As exemplified above in Examples 1 to 9, tri-n-butyl-n-pentylammonium bromide is highly valuable as a heat storage agent or a heat transport medium and applicable for various applications.

(Cold Insulation Agent)

In the above-mentioned embodiments, heat storage agents and heat transport media using tri-n-butyl-n-pentylammonium bromide or its hydrate as a main agent have been described. Since tri-n-butyl-n-pentylammonium bromide hydrate has a melting temperature of 6° C., higher than the melting point of ice, 0° C., and has a high latent heat quantity, it can be used as a cold insulation agent for cold insulation for fresh fish and shellfish and perishable food, for which purpose ice or paraffin has been conventionally used. In particular, in the case of using ice, the cold insulation temperature is 0° C., which is so low as to deteriorate the taste of fresh fish and shellfish. However, use of tri-n-butyl-n-pentylammonium bromide hydrate or a composition containing the hydrate as the main agent and other components as a cold insulation agent makes it possible to provide a cold insulation agent which can exert cold insulation for fresh fish and shellfish in a temperature range higher than 0° C. and lower than 10° C., the optimum cold insulation temperature.

The cold insulation agent is packed in a plastic container or bag body to produce a cold insulator, which is previously cooled and housed together with fresh fish and shellfish or perishable food in a cold insulation container made of a heat insulating wall material, and then distributed or stored.

The characteristics of cold insulation agents containing tri-n-butyl-n-pentylammonium bromide hydrate as a main component will be shown in Table 6 and described in detail.

TABLE 6

| Cold insulation agent example No. | Cold insulation agent composition | Concentration (%) | Melting temperature (° C.) | Latent heat quantity (J/g) | Specific heat of aqueous solution (J/g · K) | Durability to repeated freezing and melting* |
|---|---|---|---|---|---|---|
| 1 | TBPAB | Congruent concentration 34% | 6 | 193 | 3.7 | ○ |
| 2 | TBPAB (Not higher than congruent concentration) | 18% | 4 | 144 | 3.8 | ○ |
| 3 | TBPAB + TBAB 50:50 | Respective congruent concentrations | 8 | 186 | 3.7 | ○ |

TABLE 6-continued

| Cold insulation agent example No. | Cold insulation agent composition | Concentration (%) | Melting temperature (° C.) | Latent heat quantity (J/g) | Specific heat of aqueous solution (J/g · K) | Durability to repeated freezing and melting* |
|---|---|---|---|---|---|---|
| 4 | TBPAB + TBAB 30:70 | Respective congruent concentrations | 9 | 184 | 3.6 | ◯ |

*After 1000 times of repeated freezing and melting
◯: No phase separation occurred
X: Phase separation occurred 1) Tri-n-butyl-n-pentylammonium Bromide Hydrate with Congruent Concentration (Example 1 of Cold Insulation Agent)

Since tri-n-butyl-n-pentylammonium bromide (TBPAB) hydrate at the congruent melting point (6° C.) has a high latent heat quantity as high as 193 J/g, it takes a long time for the frozen hydrate to melt and completely release the stored cold and accordingly the time to be kept at the melting temperature becomes long. Therefore, in the case of using the hydrate as a cold insulation agent, the agent is excellent and suitable for keeping an object to be cooled at a proper cooling temperature for a long time.

Further, since the specific heat of an aqueous solution obtained by melting the hydrate is as high as 3.7 J/g·K, it is hard to be raises to higher temperatures and it takes a long time for the solution to reach the ambient temperature. When this is used as cold insulation agent, the agent makes it possible to keep the object to be cooled at the temperature close to the proper cooling temperature for a long time.

Further, it has been confirmed that even if freezing and melting are repeated at least 1000 times, phase separation does not occur and heat storage performance is not deteriorated. Further, tri-n-butyl-n-pentylammonium bromide hydrate has no toxicity and is therefore preferable as a cold insulation agent for perishable food.

Since tri-n-butyl-n-pentylammonium bromide hydrate has such characteristics, it is suitable for a cold insulation agent for an object to be cooled having a proper cooling temperature in a range higher than 0° C. and lower than 10° C.

2) Tri-n-butyl-n-pentylammonium Bromide Hydrate with Concentration Lower than Congruent Concentration (Example 2 of Cold Insulation Agent)

Hydrate produced by cooling an aqueous solution of tri-n-butyl-n-pentylammonium bromide with a concentration lower than congruent concentration can have a melting temperature range lower than the congruent melting point, so that the hydrate can be employed as a cold insulation agent capable of exerting cold insulation for an object to be cooled in a prescribed temperature range.

Hydrate with a concentration lower than the congruent concentration produced by cooling an aqueous solution of tri-n-butyl-n-pentylammonium bromide (TBPAB), for example, in a concentration of 18%, lower than the congruent concentration, has a melting start temperature of 4° C., and the melting temperature is gradually increased as the melting proceeds and the melting finish temperature is 6° C. The latent heat quantity at the time of melting is 144 J/g, and the specific heat of the aqueous solution obtained by melting the hydrate is as high as 3.8 J/g·K, and thus the aqueous solution is hard to be heated. Further, it has been confirmed that even if freezing and melting are repeated at least 1000 times, phase separation does not occur and heat storage capability is not deteriorated. As compared with the hydrate with the congruent concentration, it has a less latent heat quantity, but it can be employed as a cold insulation agent for cold insulation in the range of 4° C. to 6° C.

3) Hydrate Mixture of Tri-n-butyl-n-pentylammonium Bromide and Tetra-n-butylammonium Bromide (Examples 3 and 4 of Cold Insulation Agents)

Melting temperature and latent heat quantity of hydrate mixtures prepared by mixing hydrate of tri-n-butyl-n-pentylammonium bromide with the congruent concentration (TBPAB, melting point 6° C.) and hydrate of tetra-n-butylammonium bromide with the congruent concentration (TBAB, melting point 12° C.) at 50:50 or 30:70 by weight, and the specific heat of aqueous solutions thereof were determined and the results are shown in Table 6.

As shown in Table 6, it has been confirmed that: the melting temperature is 8 to 9° C.; the latent heat quantity is as high as 184 to 186 J/g; specific heat of the solutions obtained by melting the hydrates is as high as 3.6 to 3.7 J/g·K and thus the solutions are difficult to be heated; and no phase separation occurs and the heat storage capability is not deteriorated even if freezing and melting are repeated at least 1000 times. Accordingly, the hydrate mixtures can be used as a cold insulation agent suitable for cold insulation in a temperature range of 8 to 9° C.

As described above, tri-n-butyl-n-pentylammonium bromide hydrate or a composition containing the hydrate as a main agent and other components can be provided as a cold insulation agent, which may be packed in a plastic container or a bag body to provide a cold insulator.

The container or bag body to be filled with the cold insulation agent may be conventionally used containers or bag bodies of a cold insulator. Examples thereof may be bag bodies and containers (e.g., bags and packs containing jelly beverage and shampoo for refilling) made of sheets of flexible materials such as a synthetic resin film laminated with a metal foil (e.g., an aluminum foil) and plastic formed containers.

The cold insulator is produced by packing a cold insulation agent in a plastic container or bag body, which may be previously cooled and stored together with an object to be cooled in a cold insulation container for distribution and storage.

The cold insulating performance was evaluated for the tri-n-butyl-n-pentylammonium bromide hydrate with the congruent concentration (Example 1 of the cold insulation agent) and the hydrate mixture (Example 3 of the cold insulation agent) obtained by mixing tri-n-butyl-n-pentylammonium bromide hydrate with the congruent concentration and tetra-n-butylammonium bromide hydrate with the congruent concentration at 50:50 by weight.

Cold insulators respectively obtained by packing three kilograms of each of Examples 1 and 3 of insulation agents and paraffin (n-tetradecane) as Comparative Example in each polyethylene bag were cooled to 0° C. and frozen, the respective cold insulators were set in the bottoms of heat insulating boxes with 20 L capacity using vacuum heat insulating panels, and the heat insulating boxes were set in a thermostatic chamber at 30° C. to measure the inside temperatures of the heat insulating boxes with elapsed time.

Figure 9:
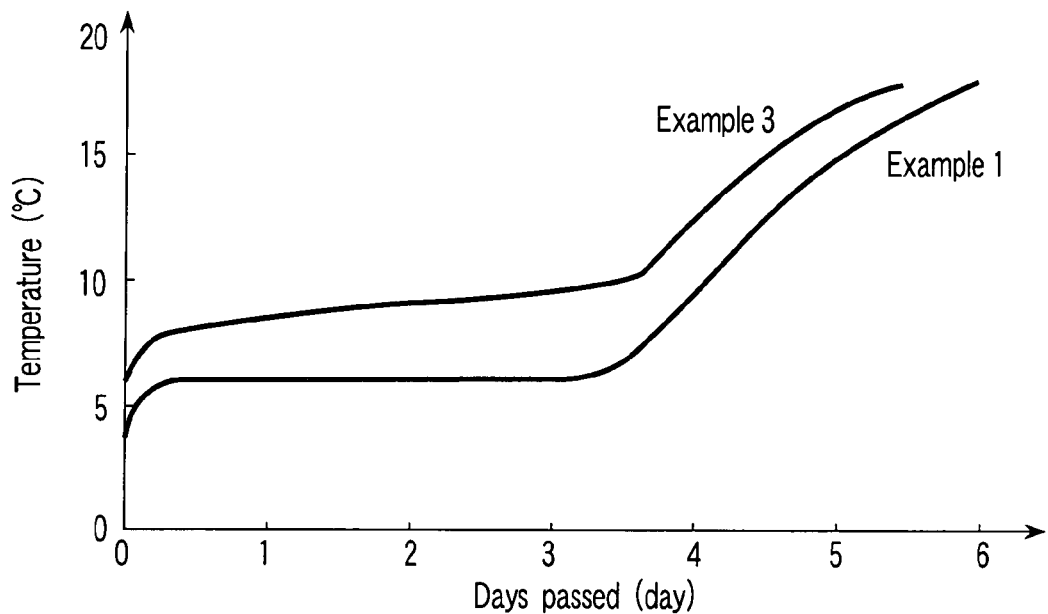
FIG. 9 is a graph showing characteristics of cold insulation agents of Examples 1 and 3 relating to cold insulation agent according to the present invention.
Figure 10:
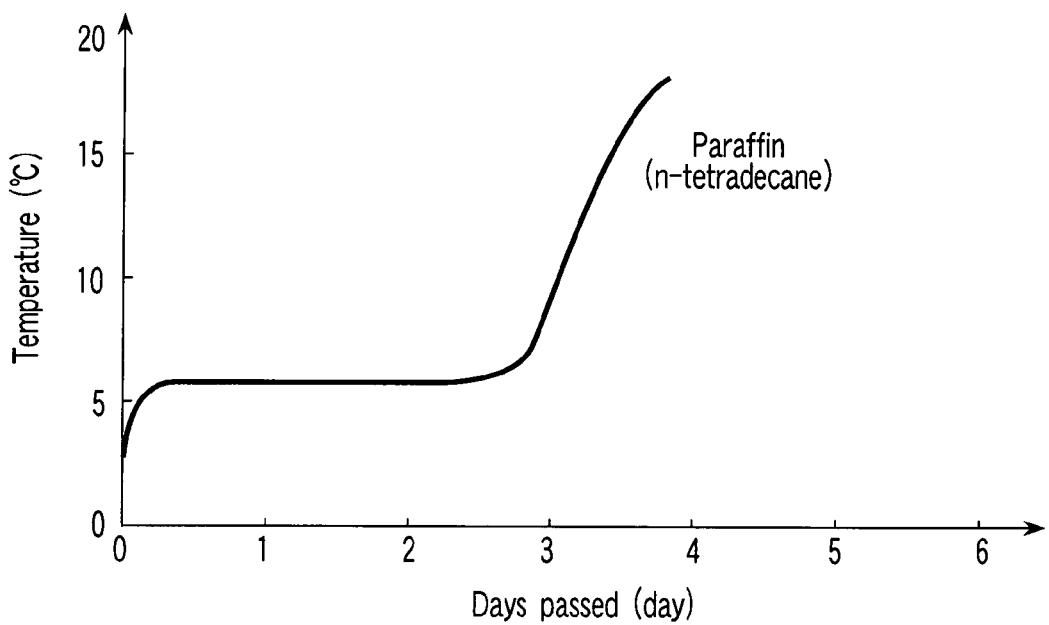
FIG. 10 is a graph showing characteristics of a cold insulation agent of Comparative Example in relation to Examples 1 and 3 relating to cold insulation agent.

FIGS. 9 and 10 are graphs showing the results, FIG. 9 shows the results of Examples 1 and 3 of the cold insulation agents and FIG. 10 shows the results of Comparative Example. In FIGS. 9 and 10, the ordinate axis shows temperature and the abscissa axis shows the days elapsed.

In the case of Example 1 of the cold insulation agent, the temperature was constant at 6° C. for 3.5 days and thereafter, melting of the cold insulation agent was finished and the temperature was raised.

In the case of Example 3 of the cold insulation agent, the temperature was constant at 8° C. for 3.5 days and thereafter, melting of the cold insulation agent was finished and the temperature was raised.

In the case of Comparative Example, the temperature was constant at 6° C. for 2.7 days and thereafter, melting of the cold insulation agent was finished and the temperature was raised rapidly.

As compared with Comparative Example, Examples 1 and 3 of the cold insulation agents have a longer cold insulating time and show small temperature rise after the melting, and are thus suitable as a cold insulation agent.

The above-mentioned cold insulation agent may be used as a cooling preventive agent. The cold insulation agent can be used as a cooling preventive agent in such a manner that when the temperature of the ambient environment is lower than that of an object to be cooled, a cooling preventive body obtained by packing the melted cold insulation agent in a container is arranged around the object to be cooled, and at the time of forming a hydrate from an aqueous solution and freezing the hydrate, this absorbs cold from the ambient environment to prevent cooling of the object to be stored.

The agent may be also used as a cooling preventive agent for preventing freezing of fresh vegetable and food in winter time.

(Melting Point Control Agent)

The characteristics of a melting point control agent containing tri-n-butyl-n-pentylammonium bromide will be described below as an example of the melting point control agent of the present invention containing a tri-n-butylalkylammonium salt.

A heat storage agent is prepared by adding tri-n-butyl-n-pentylammonium bromide forming a hydrate, with a different melting point from that of a heat storage main agent, to the heat storage main agent, so that the temperature (melting point of the mixture) at which the hydrate is produced by cooling the heat storage agent is controlled to be lower or higher than the melting point of the heat storage main agent alone. Accordingly, it is possible to control the melting point of the mixture in a desired range by adjusting the addition ratio of tri-n-butyl-n-pentylammonium bromide. Therefore, it is possible to provide a heat storage agent having a melting point suitable for the heat storage temperature of the heat storage agent required in accordance with an object to be cooled by the heat storage agent or the purpose of heat storage.

As the heat storage main agent to which tri-n-butyl-n-pentylammonium bromide as a melting point control agent is added, tetraalkylammonium compound hydrate is preferable since it is an analogous substance of tri-n-butyl-n-pentylammonium bromide and exhibits a remarkable melting point control effect.

Examples of the tetraalkylammonium compound may include tetraalkylammonium-anion salts.

Examples of the anion may include Br, F, Cl, $C_2H_5COO$, OH, $CH_3COO$, HCOO, $CH_3SO_3$, $CO_3$, $PO_4$, $HPO_4$, $WO_4$, i-$C_3H_7COO$, $O_3S(CH_2)_2SO_3$, s-$C_4H_9COO$, $NO_3$, $(CH_3)_2CH(NH_2)_2COO$, n-$C_3H_7SO_3$, $CF_3COO$, $CrO_3$, and $SO_4$.

Further, examples of alkyl may be n-butyl, iso-butyl, n-pentyl, iso-pentyl, n-propyl, iso-propyl, ethyl, methyl, n-hexyl, iso-hexyl, n-heptyl, iso-heptyl, and iso-butyl.

A specific example of the heat storage main agent to which tri-n-butyl-n-pentylammonium bromide is added as the melting point control agent may be tetra-n-butylammonium bromide. Addition of tri-n-butyl-n-pentylammonium bromide as a melting point control agent to the tetra-n-butylammonium bromide as a heat storage main agent makes it possible to change and control the melting point of the resultant heat storage agent continuously from the congruent melting point, 12° C., of the heat storage main agent of tetra-n-butylammonium bromide alone in accordance with the addition ratio.

Table 7 shows one example of the correlation between the weight ratio of an aqueous solution of tetra-n-butylammonium bromide as a heat storage main agent with a congruent concentration and an aqueous solution of tri-n-butyl-n-pentylammonium bromide as a melting point control agent with a congruent concentration, and the melting point and latent heat quantity. For example, if the aqueous solution of tetra-n-butylammonium bromide with a congruent concentration and the aqueous solution of tri-n-butyl-n-pentylammonium bromide with a congruent concentration are mixed at 50:50, the melting point becomes 9.4° C. and if the solutions are mixed at 75:25, the melting point becomes 10.7° C. Thus, the melting point can be controlled arbitrarily between the melting points of the heat storage main agent and the melting point control agent. Additionally, it has been confirmed that the total latent heat quantity of the heat storage agent obtained by adding the melting point control agent is approximately the same as the total calculated by multiplying the respective latent heat quantities of the tetra-n-butylammonium bromide hydrate as the heat storage main agent and tri-n-butyl-n-pentylammonium bromide hydrate as the melting point control agent by their composition ratios.

Further, it is also possible to use tri-n-butyl-iso-pentylammonium bromide as another melting point control agent, and Table 6 shows one example of mixing an aqueous solution of tetra-n-butylammonium bromide, as a heat storage main agent, with a congruent concentration and an aqueous solution of tri-n-butyl-iso-pentylammonium bromide, as a melting point control agent, with a congruent concentration at 50:50. The melting point of the heat storage agent can be controlled to be 14.4° C. from the congruent melting point, 12° C., of tetra-n-butylammonium bromide alone as the heat storage main agent.

TABLE 7

| Aqueous tetra-n-butylammonium bromide solution with congruent concentration (%) | Aqueous tri-n-butyl-n-pentylammonium bromide solution with congruent concentration (%) | Melting point (° C.) | Latent heat quantity (J/g) |
| --- | --- | --- | --- |
| 50 | 50 | 9.4 | 186 |
| 75 | 25 | 10.7 | 183 |
| 80 | 20 | 10.9 | 182 |

TABLE 7-continued

| Aqueous tetra-n-butylammonium bromide solution with congruent concentration (%) | | Melting point (° C.) | Latent heat quantity (J/g) |
|---|---|---|---|
| | Aqueous tri-n-butyl-iso-pentylammonium bromide solution with congruent concentration (%) | | |
| 50 | 50 | 14.4 | 201 |

In the above, the results of using tetra-n-butylammonium bromide as a heat storage main agent and adding tri-n-butyl-n-pentylammonium bromide or tri-n-butyl-isopentylammonium bromide as a melting point control agent are described. However, it is of course possible to properly select the heat storage main agent from tetraalkylammonium compounds besides tetra-n-butylammonium bromide, and the melting point of the heat storage agent can be more efficiently controlled by adjusting the addition amount of a melting point control agent.

(Supercooling Preventive Agent)

The characteristics of a supercooling preventive agent of the present invention containing a tri-n-butylalkylammonium salt hydrate will be described below.

Supercooling of the heat storage main agent can be efficiently prevented by adding a proper amount of tri-n-butylalkylammonium salt to the heat storage main agent. In the case the heat storage main agent is a tetraalkylammonium compound hydrate, a tri-n-butylalkylammonium salt has an effective supercooling preventive ability since it is an analogous substance of the heat storage main agent. Effective supercooling preventive ability can be provided even in the case of another tri-n-butylalkylammonium salt or its hydrate, as a cold storage main agent, having a melting point lower than that of the tri-n-butylalkylammonium salt as a supercooling preventive agent.

That is, when an aqueous solution prepared by mixing a heat storage main agent such as a tetraalkylammonium compound or a tri-n-butylalkylammonium salt or its hydrate with, as a supercooling preventive agent, a tri-n-butylalkylammonium salt having a melting point higher than that of the heat storage main agent is cooled, at first the hydrate of the supercooling preventive agent is produced and functions as a nucleus of the hydrate production of the heat storage main agent to prevent supercooling.

Specific examples of the tetraalkylammonium compound as the cold storage main agent may include tetra-n-butylammonium bromide, and a case of using tri-n-butyl-iso-pentylammonium bromide as a supercooling preventive agent will be described.

Supercooling of a heat storage agent is prevented and a heat storage agent hydrate is reliably produced within a short time by producing the heat storage agent by adding 1 to 20 wt % of an aqueous tri-n-butyl-iso-pentylammonium bromide solution with the congruent concentration (melting point 17° C.), as a supercooling preventive agent, to an aqueous tetra-n-butylammonium bromide solution with the congruent concentration (melting point 12° C.), a heat storage main agent. The supercooling preventive agent can maintain the supercooling preventive ability without causing separation even after repeated freezing and melting of the heat storage agent.

Similarly, supercooling of heat storage agents can be prevented by producing the heat storage agents by adding an aqueous tri-n-butyl-iso-pentylammonium fluoride solution with the congruent concentration (melting point 27° C.), as a supercooling preventive agent, to an aqueous tetra-n-butylammonium bromide solution with the congruent concentration, as a heat storage main agent, or by adding aqueous tri-n-butyl-iso-pentylammonium bromide solution with the congruent concentration (melting point 17° C.), as a supercooling preventive agent, to an aqueous tri-n-butyl-n-pentylammonium bromide solution with the congruent concentration (melting point 6° C.), as a heat storage main agent.

An addition method of the tri-n-butylalkylammonium salt as a supercooling preventive agent is not limited to the method of adding an aqueous solution with the congruent concentration but may be a method of adding a powder of a tri-n-butylalkylammonium salt.

In the above description, addition of a tri-n-butylalkylammonium salt as a supercooling preventive agent in the case of using tetra-n-butylammonium bromide or tri-n-butyl-n-pentylammonium bromide, or their hydrate as a heat storage main agent has been described. However, the heat storage main agent is not limited to those and it is needless to say that the heat storage main agent may be properly selected from tetraalkylammonium compounds and tri-n-butylalkylammonium salts, and the addition amount of the supercooling preventive agent is preferably in the range of 1 to 20 wt % to the heat storage main agent. Accordingly, supercooling can be efficiently prevented and the supercooling preventive ability can be retained.

If the addition amount of the supercooling preventive agent is lower than the lowest limit, the effect for preventing the supercooling by forming a nucleus for hydrate production of the heat storage main agent becomes insufficient. On the other hand, if the addition amount of the supercooling preventive agent is higher than the highest limit, the melting point of the hydrate of the heat storage main agent is strongly affected by the supercooling preventive agent and the melting point is increased, which is undesirable.

The above-mentioned numeral range of the addition ratio of the supercooling preventive agent is one example, and it is needless to say that the addition ratio of the supercooling preventive agent in the present invention is not necessarily limited to the exemplified range.

INDUSTRIAL APPLICABILITY

A heat storage substance, a heat storage agent, a cold insulation agent, a heat transport medium, and their main agents of the present invention comprise a tri-n-butylalkylammonium salt and water, are economical and less corrosive, and have a high latent heat quantity. Therefore, they have excellent properties as the heat storage agent, the cold insulation agent, the heat transport medium (including microcapsules) and their main agents as well as the content of a heat reservoir and a cold insulator.

A cold insulation agent of the present invention comprises a tri-n-butylalkylammonium salt and water, has a melting point in the range of 0° C. to 10° C. suitable for proper cooling temperature as well as a high latent heat quantity and high specific heat in the liquid state, and durability to repeated use. Accordingly, the agent is suitable as a cold insulation agent for an object to be cooled having a proper cooling temperature in a range higher than 0° C. and lower than 10° C.

A melting point control agent for a heat storage agent of the present invention can control the melting point of the heat storage agent without lowering the latent heat quantity thereof.

Further, a supercooling preventive agent for a heat storage agent of the present invention has a high supercooling preventive ability and maintains the supercooling preventive ability even if freezing and melting are repeated.

The invention claimed is:

1. A heat storage agent comprising either tri-n-butyl-n-pentylammonium bromide or tri-n-butyl-n-pentylammonium chloride, a corrosion inhibitor and water.

2. The heat storage agent according to claim 1, further comprising a tetraalkylammonium compound.

3. The heat storage agent according to claim 1, further comprising tetra-n-butylammonium bromide.

4. A heat storage agent comprising tri-n-butyl-n-pentylammonium bromide hydrate or tri-n-butyl-n-pentylammonium chloride hydrate.

5. The heat storage agent according to claim 4, further comprising tetra-n-butylammonium bromide hydrate.

6. A heat transport medium comprising tri-n-butyl-n-pentylammonium bromide hydrate or tri-n-butyl-n-pentylammonium chloride hydrate.

7. A heat transport medium in a form of slurry comprising tri-n-butyl-n-pentylammonium bromide hydrate particles dispersed in an aqueous solution containing tri-n-butyl-n-pentylammonium bromide.

8. A cold insulation agent comprising tri-n-butyl-n-pentylammonium bromide hydrate.

9. A cold insulation agent comprising tri-n-butyl-n-pentylammonium bromide hydrate, and tetra-n-butylammonium bromide hydrate.

* * * * *